US012809454B2

(12) United States Patent
Song et al.

(10) Patent No.: US 12,809,454 B2

(45) Date of Patent: Nov. 24, 2026

(54) ELECTRONIC SYSTEM, ELECTRONIC DEVICE AND CONTROLLING METHOD THEREOF

(71) Applicant: SAMSUNG ELECTRONICS CO., LTD., Suwon-si (KR)

(72) Inventors: Sukho Song, Suwon-si (KR); Mugong Bae, Suwon-si (KR); Seungki Cho, Suwon-si (KR); Byeol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/355,499

(22) Filed: Oct. 10, 2025

(65) Prior Publication Data

US 2026/0118952 A1 Apr. 30, 2026

Related U.S. Application Data

(63) Continuation of application No. PCT/KR2025/010468, filed on Jul. 16, 2025.

(30) Foreign Application Priority Data

Oct. 4, 2024 (KR) ........................ 10-2024-0134829

(51) Int. Cl.
*G06F 3/01* (2006.01)

(52) U.S. Cl.
CPC .................................... *G06F 3/012* (2013.01)

(58) Field of Classification Search
CPC ............................ G06F 3/012; H04N 21/4728

(Continued)

(56) References Cited

U.S. PATENT DOCUMENTS 10,096,301 B2 10/2018 Ahn et al.
10,209,773 B2 2/2019 Khaderi et al.

(Continued)

FOREIGN PATENT DOCUMENTS

CN 100418112 C * 9/2008 ............... G07C 9/37
CN 108295469 B 3/2021

(Continued)

OTHER PUBLICATIONS

Written Opinion (PCT/ISA/237) dated Oct. 21, 2025 issued by the International Searching Authority in International Application No. PCT/KR2025/010468.

(Continued)

*Primary Examiner* — Duane N Taylor, Jr.

(74) *Attorney, Agent, or Firm* — Sughrue Mion, PLLC

(57) ABSTRACT

An electronic device includes: a camera; memory storing instructions; and at least one processor including processing circuitry, where the instructions, when executed by the at least one processor individually or collectively, cause the electronic device to: based on an application being selected, identify a target group of one or more motion parameters among a plurality of predetermined groups of motion parameters based on a movement range of a field of view of the application, obtain an image from the camera, obtain motion data of a head object based on the image, obtain target data corresponding to the target group from the motion data, and provide a content image based on the target data.

20 Claims, 34 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2022/0409995 | A1 | 12/2022 | Bevensee et al. |
| 2023/0412865 | A1 | 12/2023 | Harviainen |
| 2024/0121379 | A1 | 4/2024 | Drozdov et al. |

FOREIGN PATENT DOCUMENTS

| | | | | |
|---|---|---|---|---|
| JP | 2018-163617 | A | 10/2018 | |
| JP | 2019-519053 | A | 7/2019 | |
| KR | 10-2015-0142282 | A | 12/2015 | |
| KR | 10-2018-0068709 | A | 6/2018 | |
| KR | 10-2018-0112478 | A | 10/2018 | |
| KR | 102204212 | B1 * | 1/2021 | ........... H04N 21/816 |

OTHER PUBLICATIONS

International Search Report (PCT/ISA/210) dated Oct. 21, 2025 issued by the International Searching Authority in International Application No. PCT/KR2025/010468.

* cited by examiner

FIG. 9
910
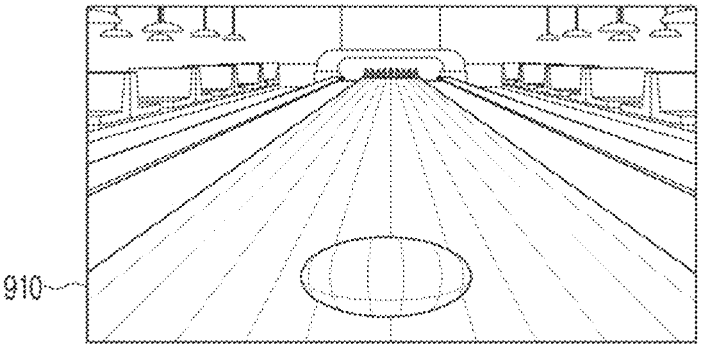
920
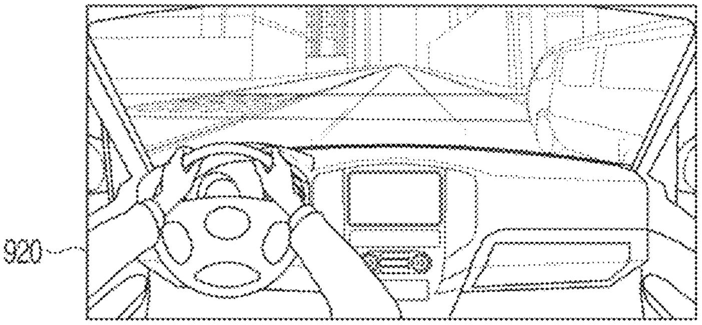
930
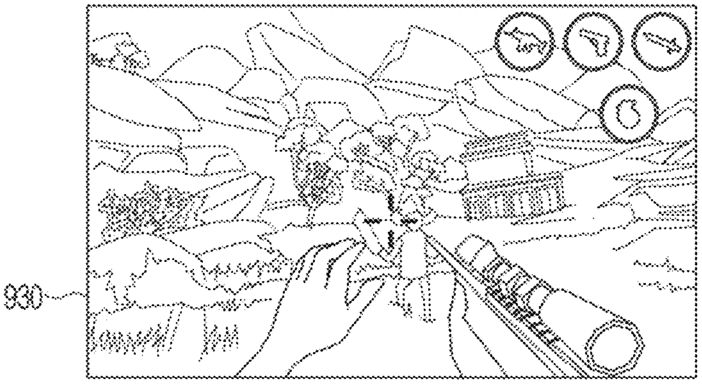

FIG. 10

1010

| TABLE OF GROUPS OF MOVEMENT RANGES OF A FIELD OF VIEW | | |
|---|---|---|
| CLASSIFICATION | R(MOVEMENT RANGE OF A FIELD OF VIEW) | GROUP |
| 1 | 0≤R<th1 | 1 |
| 2 | th1≤R<th2 | 2 |
| 3 | th2≤R | 3 |

1020

| TABLE OF GROUPS OF APPLICATIONS | | | |
|---|---|---|---|
| IDENTIFICATION INFORMATION | MOVEMENT RANGE OF A FIELD OF VIEW | GROUP<br>th1=60 DEGREES<br>th2=120 DEGREES | ADDITIONAL INFORMATION |
| #01 | 0 | 1 | MOVEMENT OF A FIELD OF VIEW IS IMPOSSIBLE |
| #02 | 30 | 1 | |
| #03 | 100 | 2 | |
| #04 | 180 | 3 | |
| #05 | 360 | 3 | CONVERSION IN 360 DEGREES IS POSSIBLE |
| ... | ... | ... | ... |

FIG. 17

1710

| TABLE OF TARGET DATA FOR EACH GROUP | | | | | | |
|---|---|---|---|---|---|---|
| CLASSIFICATION | MOVEMENT COORDINATE | | | ROTATION ANGLE | | |
| | x | y | z | roll | pitch | yaw |
| GROUP 1 | O | O | O | X | X | X |
| GROUP 2 | O | O | O | X | O | O |
| GROUP 3 | O | O | O | X | O | O |

1720

| TABLE OF TARGET DATA FOR EACH GROUP | |
|---|---|
| GROUP 1 | x, y, z |
| GROUP 2 | x, y, z, pitch, yaw |
| GROUP 3 | x, y, z, pitch, yaw |

FIG. 19

1900

| DATA CONVERSION TABLE (THIRD GROUP) | |
|---|---|
| TARGET DATA | CONVERSION DATA (a, b ARE CONSTANTS) |
| x | x |
| y | y |
| z | z |
| pitch | pitch + z*b |
| yaw | yaw + y*a |

FIG. 24
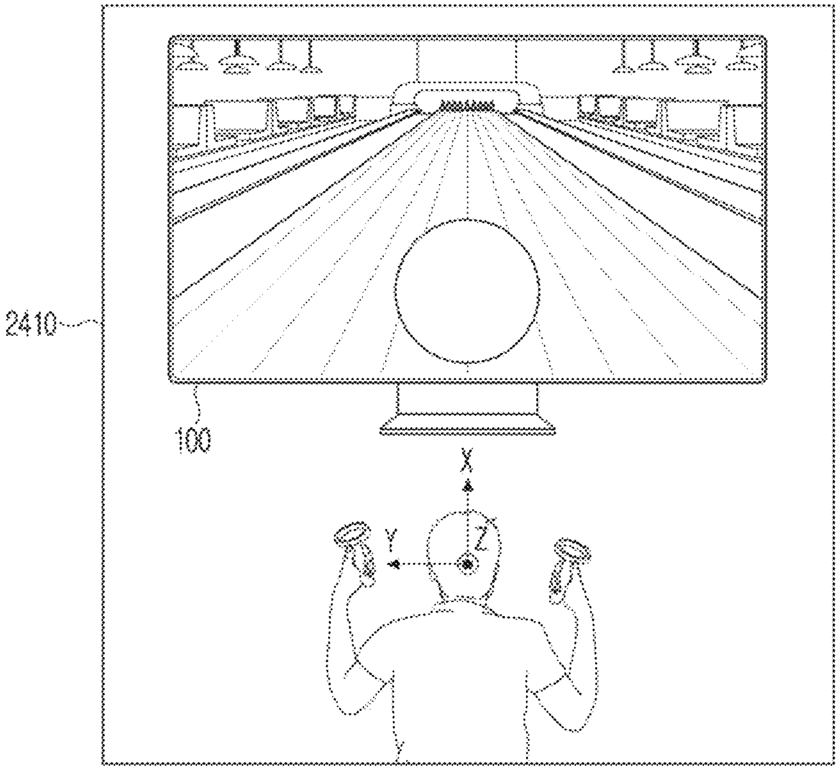
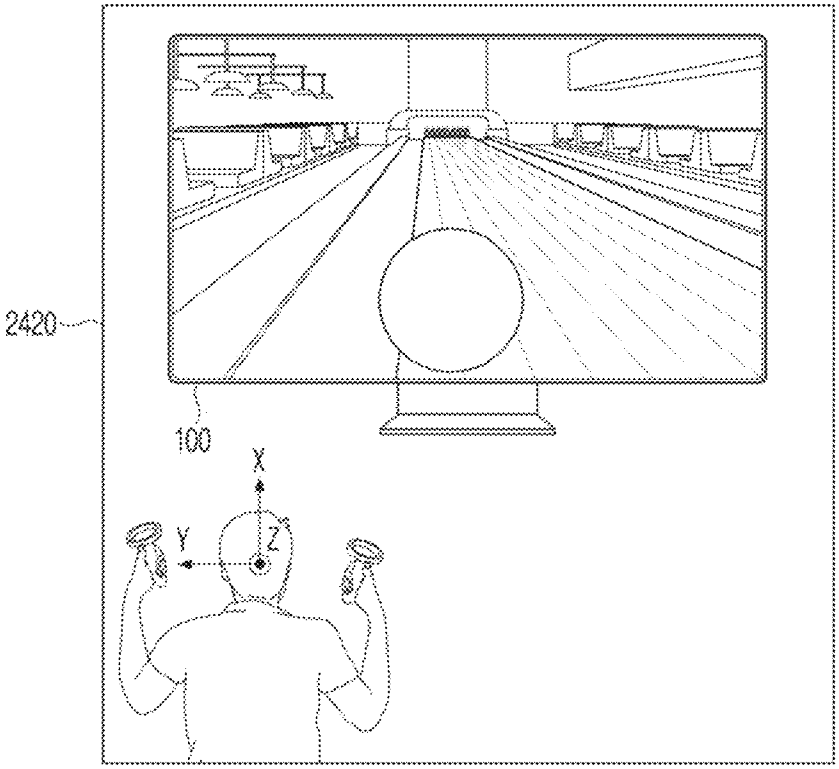

ELECTRONIC SYSTEM, ELECTRONIC DEVICE AND CONTROLLING METHOD THEREOF

CROSS-REFERENCE TO RELATED APPLICATION

This application is a bypass continuation of International Application No. PCT/KR2025/010468, filed on Jul. 16, 2025, which is based on and claims priority to Korean Patent Application No. 10-2024-0134829, filed on Oct. 4, 2024, in the Korean Intellectual Property Office, the disclosures of which are incorporated by reference herein in their entireties.

BACKGROUND

1. Field

The disclosure relates to an electronic system, electronic device and a controlling method thereof, and more particularly, to an electronic system and an electronic device that provide a content image according to a user's movement, and a controlling method thereof.

2. Description of Related Art

An electronic apparatus may track a user's movement. Also, the electronic apparatus may display different screens corresponding to the user's movement. Further, the electronic apparatus may display screens corresponding to different points of views in consideration of the user's movement.

In the case of providing services such as extended reality (XR), virtual reality (VR), augmented reality (AR), etc., the point of view of a displayed screen may be changed according to a user's movement.

In the case of providing images provided from all contents or applications by the same method, there may be inconvenience in viewing conversion of the screen.

For example, a game in which movement is possible only to the front side in a three-dimensional space is assumed as an example. In case screen conversion is performed in a sensitive way for all of the user's movements, there is a problem that the user feels dizzy.

SUMMARY

Provided are an electronic system and an electronic apparatus that provide a content image in consideration of a user's movement and a range of movements of a field of view of an application, and a controlling method thereof.

According to an aspect of the disclosure, an electronic device may include: a camera; memory storing instructions; and at least one processor including processing circuitry, where the instructions, when executed by the at least one processor individually or collectively, cause the electronic device to: based on an application being selected, identify a target group of one or more motion parameters among a plurality of predetermined groups of motion parameters based on a movement range of a field of view of the application, obtain an image from the camera, obtain motion data of a head object based on the image, obtain target data corresponding to the target group from the motion data, and provide a content image based on the target data.

The instructions, when executed by the at least one processor individually or collectively, may further cause the electronic device to: based on the application being selected, obtain the movement range of the field of view of the application, and based on a table including the plurality of predetermined groups respectively corresponding to a plurality of movement ranges of the field of view stored in the memory, identify the target group corresponding to the movement range of the field of view among the plurality of predetermined groups.

The instructions, when executed by the at least one processor individually or collectively, may further cause the electronic device to: identify the head object in the image, and obtain the motion data based on a movement of the head object, where the motion data includes: at least one of a first value corresponding to a movement along a first direction, a second value corresponding to a movement along a second direction, a third value corresponding to a movement along a third direction, a roll value corresponding a rotation about the first direction, a pitch value corresponding a rotation about the second direction, or a yaw value corresponding a rotation about the third direction.

The instructions, when executed by the at least one processor individually or collectively, may further cause the electronic device to: obtain the target data corresponding to the target group based on target data tables for the plurality of predetermined groups stored in the memory.

The instructions, when executed by the at least one processor individually or collectively, may further cause the electronic device to: based on the movement range of the field of view being less than or equal to a first threshold angle, classify the application as a first group, based on the movement range of the field of view exceeding the first threshold angle and being less than or equal to a second threshold angle, classify the application as a second group, and based on the movement range of the field of view exceeding the second threshold angle, classify the application as a third group.

The instructions, when executed by the at least one processor individually or collectively, may further cause the electronic device to: based on the target group being the first group, obtain the target data including the first value, the second value, and the third value.

The instructions, when executed by the at least one processor individually or collectively, may further cause the electronic device to: based on the application being classified as the second group, obtain the target data including the first value, the second value, the third value, the pitch value, and the yaw value.

The instructions, when executed by the at least one processor individually or collectively, may further cause the electronic device to: based on the application being classified as the third group, obtain the target data including the first value, the second value, the third value, the pitch value, and the yaw value.

The instructions, when executed by the at least one processor individually or collectively, may further cause the electronic device to: convert the target data based on a data conversion table stored in the memory, and provide the content image based on the converted target data.

The instructions, when executed by the at least one processor individually or collectively, may further cause the electronic device to: convert the yaw value based on a product of the second value and a first constant, convert the pitch value based on a product of the third value and a second constant, and obtain the converted target data including the first value, the second value, the third value, the converted pitch value, and the converted yaw value.

According to an aspect of the disclosure, a controlling method of an electronic device may include: based on an application being selected, identifying a target group of one or more motion parameters among a plurality of predetermined groups of motion parameters based on a movement range of a field of view of the application; obtaining an image; obtaining motion data of a head object based on the image; obtaining target data corresponding to the target group from the motion data; and providing a content image based on the target data.

The obtaining the target group may include: based on the application being selected, obtaining the movement range of the field of view of the application; and based on a table including the plurality of predetermined groups respectively corresponding to a plurality of movement ranges of the field of view stored in the electronic device, identifying the target group corresponding to the movement range of the field of view among the plurality of predetermined groups.

The obtaining the motion data may include: identifying the head object in the image; and obtaining the motion data based on a movement of the head object, where the motion data includes: at least one of a first value corresponding to a movement along a first direction, a second value corresponding to a movement along a second direction, a third value corresponding to a movement along a third direction, a roll value corresponding a rotation about the first direction, a pitch value corresponding a rotation about the second direction, or a yaw value The obtaining the target data may include: obtaining the target data corresponding to the target group based on target data tables for the plurality of predetermined groups stored in the electronic device.

The obtaining the target group may include: based on the movement range of the field of view being less than or equal to a first threshold angle, classifying the application as a first group; based on the movement range of the field of view exceeding the first threshold angle and being less than or equal to a second threshold angle, classifying the application as a second group; and based on the movement range of the field of view exceeding the second threshold angle, classifying the application as a third group.

According to an aspect of the disclosure, an electronic device may include: memory storing instructions; and at least one processor including processing circuitry and operatively connected to a sensor, where the instructions, when executed by the at least one processor individually or collectively, cause the electronic device to: based on an application being selected, identify a target group of one or more motion parameters among a plurality of predetermined groups of motion parameters based on a movement range of a field of view of the application, obtain motion data of a head object based on the sensor, obtain target data corresponding to the target group from the motion data, and provide a content image based on the target data.

The instructions, when executed by the at least one processor individually or collectively, may further cause the electronic device to: based on the application being selected, obtain the movement range of the field of view of the application, and based on a table including the plurality of predetermined groups respectively corresponding to a plurality of movement ranges of the field of view stored in the memory, identify the target group corresponding to the movement range of the field of view among the plurality of predetermined groups.

The motion data may be obtained based on a movement of the head object sensed by the sensor, where the motion data includes: at least one of a first value corresponding to a movement along a first direction, a second value corresponding to a movement along a second direction, a third value corresponding to a movement along a third direction, a roll value corresponding a rotation about the first direction, a pitch value corresponding a rotation about the second direction, or a yaw value corresponding a rotation about the third direction.

The instructions, when executed by the at least one processor individually or collectively, may further cause the electronic device to: obtain the target data corresponding to the target group based on target data tables for the plurality of predetermined groups stored in the memory.

The instructions, when executed by the at least one processor individually or collectively, may further cause the electronic device to: based on the movement range of the field of view being less than or equal to a first threshold angle, classify the application as a first group, based on the movement range of the field of view exceeding the first threshold angle and being less than or equal to a second threshold angle, classify the application as a second group, and based on the movement range of the field of view exceeding the second threshold angle, classify the application as a third group.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram for illustrating applications for each group according to an embodiment;

FIG. 10 is a diagram for illustrating a group table according to an embodiment;

FIG. 17 is a diagram for illustrating target data tables for each group according to an embodiment;

FIG. 19 is a diagram for illustrating a conversion table corresponding to a third group according to an embodiment;

FIG. 24 is a diagram for illustrating a content image provided in an application of a first group according to an embodiment;

DETAILED DESCRIPTION

Figure 1:
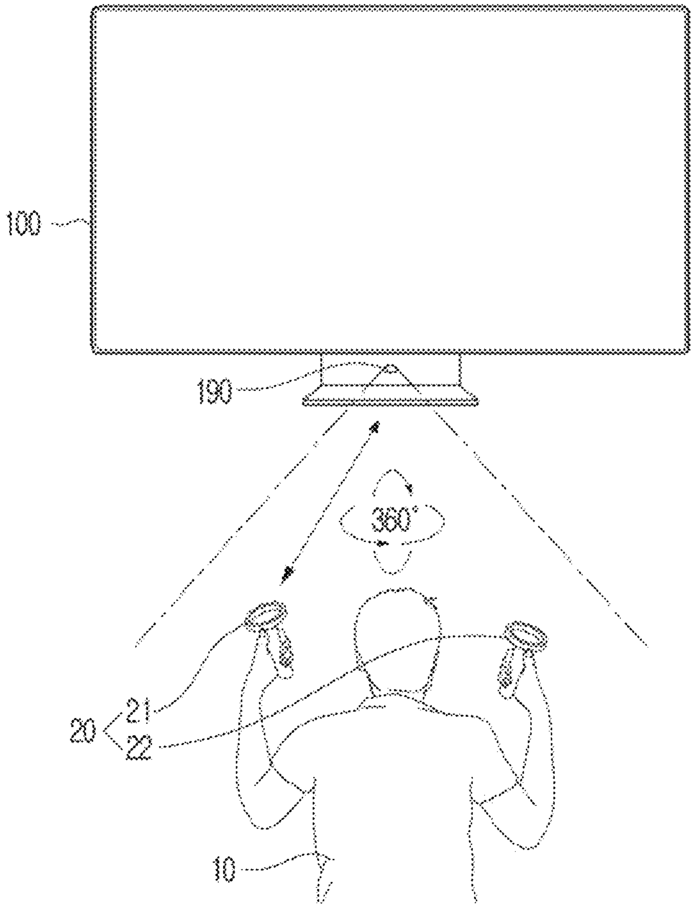
FIG. 1 is a diagram for illustrating an operation of sensing a user according to an embodiment of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "comprise," "may comprise," "have," "may have," "include," "may include," and the like, denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected with/to" another element (e.g.: a second element) should be interpreted to include both the case where the one element is directly coupled to the another element, and the case where the one element is coupled to the another element through still another element (e.g.: a third element).

Also, singular expressions include plural expressions, unless defined obviously differently in the context. Further, in the disclosure, terms such as "include" or "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Also, a plurality of "modules" or "parts" may be integrated into at least one module and implemented as at least one processor, except "a module" or "a part" that needs to be implemented as specific hardware.

Further, in this specification, the term "user" may refer to a person who uses an electronic apparatus or an apparatus using an electronic apparatus (e.g.: an artificial intelligence electronic apparatus).

Hereinafter, an embodiment of the disclosure will be described in more detail with reference to the accompanying drawings.

The electronic system may refer to a system implemented using at least one device. The at least one device may be described as an electronic device. The system may include at least one of an electronic apparatus 100, a remote control apparatus, a server 200, or a content providing apparatus 300. The electronic device included in the system may refer to the electronic apparatus 100, the remote control apparatus, the server 200, or the content providing apparatus 300.

FIG. 1 is a diagram for illustrating an operation of photographing a user according to an embodiment of the disclosure.

Referring to FIG. 1, an electronic apparatus 100 may display a screen. The electronic apparatus 100 may provide a screen related to an application. The application may indicate various types of software provided in the electronic apparatus 100. Also, the application may be an application that recognizes a user and provides an image. For example, the application may include one of a game application, an education application, or a map application.

As an example, the application may provide a virtual reality (VR) content or an augmented reality (AR) content.

The electronic apparatus 100 may recognize a user 10, and provide a content image based on a movement of the user 10. For recognizing the user 10, the electronic apparatus 100 may use a camera 190. The electronic apparatus 100 may include the camera 190.

The electronic apparatus 100 may obtain a photographed image including the user 10 through the camera 190. The electronic apparatus 100 may identify a movement of the user 10 included in the photographed image. The electronic apparatus 100 may provide a changed screen (or a changed image) according to the movement of the user 10.

As an example, the electronic apparatus 100 may identify a head object of the user 10 based on the photographed image, and provide a content image based on at least one of the location of the head object or the direction of the head object.

As an example, the electronic apparatus 100 may be communicatively connected with a remote control apparatus 20. The remote control apparatus 20 may be an apparatus for controlling the electronic apparatus 100. For example, the remote control apparatus 20 may include at least one of a remote control, a game controller, a manipulation controller, or a joystick.

As an example, the remote control apparatus 20 may include a plurality of apparatuses. The remote control apparatus 20 may include a first remote control apparatus 21 and a second remote control apparatus 22. The electronic apparatus 100 may be communicatively connected with the first remote control apparatus 21 and the second remote control apparatus 22.

The electronic apparatus 100 may include a display 140. The electronic apparatus 100 may display a content image through the display 140. As an example, the display may be a light field display.

Figure 2:
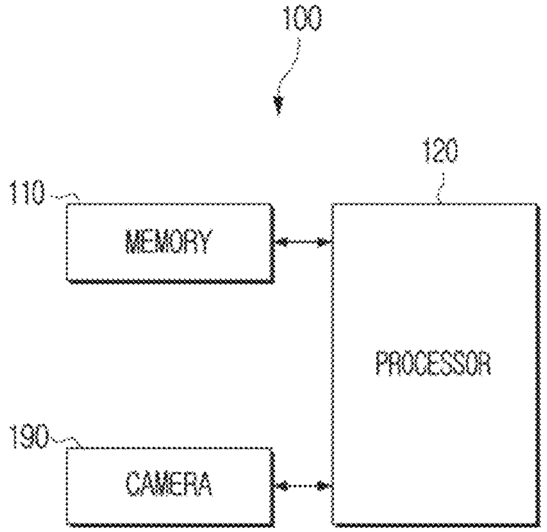
FIG. 2 is a block diagram illustrating an electronic apparatus according to an embodiment.

FIG. 2 is a block diagram illustrating the electronic apparatus 100 according to an embodiment.

The electronic apparatus 100 may include a camera 190, memory 110 storing instructions, and at least one processor including processing circuitry. According to an embodiment, the camera 190 may be a sensor that is operatively connected to the electronic apparatus 100.

The electronic apparatus 100 may be an electronic blackboard, a TV, a desktop PC, a laptop, a smartphone, a tablet PC, a server, a video game console, or any combination thereof. However, the aforementioned examples are merely examples for explaining the electronic apparatus 100, and the electronic apparatus 100 is not necessarily limited to the aforementioned apparatuses.

The at least one processor 120 may perform overall control operations of the electronic apparatus 100. The at least one processor 120 may perform a function of controlling the overall operations of the electronic apparatus 100.

When an application is selected, the at least one processor 120 may identify a target group corresponding to the application among a plurality of predetermined groups based on a movement range of a field of view of the application, obtain a photographed image through the camera 190, obtain motion data of a head object based on the photographed image, obtain target data corresponding to the target group in the motion data, and provide a content image generated based on the target data. As used herein, a target group may refer to a subset of motion parameters among the plurality of motion parameters included in motion data.

The at least one processor 120 may identify an application provided by the electronic apparatus 100. The at least one processor 120 may identify an application that provides a content provided to the user. The content may include at least one of an image or audio. The at least one processor 120 may provide the content to the user.

As an example, the at least one processor 120 may identify an application that is currently being executed.

As an example, the at least one processor 120 may identify an application selected by the user. The at least one processor 120 may receive a user input for selecting the application.

When an application is selected (or identified), the at least one processor 120 may identify a movement range of a field of view of the application.

The movement range of a field of view does not indicate a fixed field of view provided on the screen that is currently displayed, but may indicate a movable angle of a field of view that can be provided by an application. For example, the movement range of the field of view may refer to a movable angle of a virtual point of view provided by an application.

As an example, a movement range of a field of view may indicate a maximum range of a field of view that can be provided by an application.

As an example, a movement range of a field of view may indicate a movable range of a field of view of an application.

As an example, a movement range of a field of view may indicate a range of a field of view that can be provided by an application.

As an example, a movement range of a field of view may indicate a horizontal angle at which screen conversion is possible in an application. A movement range of a field of view may indicate a range of a field of view that is movable in a horizontal direction based on the x-y plane in FIG. 7. A movement range of a field of view may indicate a range of a yaw value that is rotatable centered around the z axis in FIG. 7.

As an example, a movement range of a field of view may be described as a movable range of a field of view, a rotation range of a field of view, a rotatable range of a field of view, a movement angle of a field of view, a rotation angle of a field of view, or the like, that can be provided by the application.

As an example, a movement range of a field of view may indicate a range at which a field of view is movable on a two-dimensional plane.

As an example, a movement range of a field of view may indicate a range at which a field of view is movable on a three-dimensional plane.

As an example, a movement range of a field of view may be described as a field of view of an application, a range of a field of view of an application, or the like.

When an application is selected, the at least one processor 120 may obtain a movement range of a field of view of the application, and identify a target group corresponding to the movement range of a field of view among a plurality of predetermined groups based on a table of groups of movement ranges of a field of view stored in the memory 110.

The table of groups of movement ranges of a field of view may include a standard for classifying groups according to movement ranges of a field of view. The standard (a threshold angle) stored in the table of groups of movement ranges of a field of view may be changed by the user's setting.

The table of groups of movement ranges of a field of view may be described as a first table. The table of groups of movement ranges of a field of view will be described in FIG. 10.

According to various embodiments, a target group may be identified (or determined).

As an example, the at least one processor 120 may obtain metadata of an application, and identify a target group based on a movement range of a field of view included in the metadata. Explanation in this regard will be described in FIG. 12.

As an example, the at least one processor 120 may obtain a movement range of a field of view of an application based on a plurality of photographed images. The at least one processor 120 may identify a target group based on the movement range of a field of view that was calculated (or evaluated) based on the photographed images. Explanation in this regard will be described in FIG. 13.

As an example, the at least one processor 120 may identify a target group based on identification information of an application. Explanation in this regard will be described in FIG. 14.

As an example, the at least one processor 120 may receive a user input for selecting a target group through a guide image. The at least one processor 120 may identify the target group based on the received user input. Explanation in this regard will be described in FIG. 15 and FIG. 16.

The at least one processor 120 may identify a head object in a photographed image.

Then, the at least one processor 120 may obtain motion data indicating a movement of the head object. The motion data may include at least one of an x value, a y value, a z value, a roll value, a pitch value, or a yaw value. Explanation regarding the x value, the y value, the z value, the roll value, the pitch value, and the yaw value will be described in FIG. 7.

The at least one processor 120 may obtain target data corresponding to the target group of motion parameters based on a table of target data for each motion parameter stored in the memory 110.

Different types of data for each group among the plurality of data included in the motion data may be included in the target data. The table of target data for each group may include a standard for determining data to be included in the target data. The table of target data for each group may be described as a second table. The table of target data for each group will be described in FIG. 17.

If a movement range of a field of view is smaller than or equal to a first threshold angle, the at least one processor 120 may classify an application as a first group, which corresponds to a first group of target data. If a movement range of a field of view exceeds the first threshold angle and is smaller than or equal to a second threshold angle, the at least one processor 120 may classify an application as a second group, which corresponds to a second group of target data. If a movement range of a field of view exceeds the second threshold angle, the at least one processor 120 may classify an application as a third group, which corresponds to a third group of target data. Explanation in this regard will be described in FIG. 8 and FIG. 9.

An application corresponding to the first group may be described as a first type application or a going-straight type application.

An application corresponding to the second group may be described as a second type application or a forward type application.

An application corresponding to the third group may be described as a third type application or a 360 degrees application.

If the application is classified as the first group, the at least one processor 120 may obtain target data (or first target data) including an x value, a y value, and a z value.

The at least one processor 120 may not provide a roll value, a pitch value, and a yaw value to an application. Even if motion data actually includes a roll value, a pitch value, and a yaw value, the at least one processor 120 may remove (or exclude) the roll value, the pitch value, and the yaw value from the target data, and thereby make the application recognize that there is no change to the roll value, the pitch value, and the yaw value.

In some examples, if a point of view is changed according to the roll value, the pitch value, and the yaw value in the application corresponding to the first group, the user may feel dizzy.

The application may generate a content image only with the x value, the y value, and the z value without considering the roll value, the pitch value, and the yaw value. The user can see the content image without an unnecessary change of the point of view of the observer. A content image provided by an application of the first group will be described in FIG. 24 to FIG. 26.

If the application is classified as the second group, the at least one processor 120 may obtain target data (or second target data) including an x value, a y value, a z value, a pitch value, and a yaw value.

In some examples, if a point of view is changed according to the roll value in the application corresponding to the second group or the third group, the user may feel dizzy.

The application may generate a content image only with the x value, the y value, the z value, the pitch value, and the yaw value without considering the roll value. The user can see the content image without an unnecessary change of the point of view of the observer. A content image provided by an application of the second group will be described in FIG. 27 and FIG. 28.

If the target group is the third group, the at least one processor 120 may obtain target data (or third target data) including an x value, a y value, a z value, a pitch value, and a yaw value.

An operation of obtaining different target data for each group will be described in FIG. 18.

The at least one processor 120 may convert target data based on a data conversion table stored in the memory 110.

Then, the at least one processor 120 may provide a content image generated based on the converted target data.

The data conversion table may include a calculation method or an operation algorithm of converting target data. The data conversion table may include a conversion algorithm for an application included in the third group.

The data conversion table may be described as a third table. The data conversion table will be described in FIG. 19.

The at least one processor 120 may convert the yaw value based on a value of multiplying the y value with a first constant. The first constant may be a negative number. Also, the first constant may be a constant for correcting the yaw value based on the y value.

The at least one processor 120 may convert the pitch value based on a value of multiplying the z value with a second constant. The second constant may be a positive number.

Also, the second constant may be a constant for correcting the pitch value based on the z value.

The at least one processor 120 may obtain the converted target data including the x value, the y value, the z value, the converted pitch value, and the converted yaw value.

The first constant and the second constant may be changed according to the user's setting.

In the case of correcting the yaw value in consideration of the first constant, the point of view that is changed according to moving to the y axis may be corrected to view a virtual object 30. The electronic apparatus 100 may provide a point of view toward the virtual object 30.

In the case of correcting the pitch value in consideration of the second constant, the point of view that is changed according to moving to the z axis may be corrected to view the virtual object 30. The electronic apparatus 100 may provide a point of view toward the virtual object 30.

An operation of converting target data of an application corresponding to the third group will be described in FIG. 20. An operation of displaying a content image by conversion of target data will be described in FIG. 29 to FIG. 33.

As an example, an operation of providing a content image by changing a point of view according to a movement of a head object will be described in FIG. 21.

As an example, an operation of transmitting information with a content providing apparatus will be described in FIG. 22.

As an example, an operation of comparing motion data obtained from a plurality of photographed images will be described in FIG. 23.

In the various embodiments of the disclosure, it is described that an application generates a content, and the electronic apparatus 100 provides the generated content. It should be understood that the expression 'application' may be replaced by the expression 'content.' That is, it should be understood that an entire application is not limited to only one classification, and an application may be classified based on a current state of the application. That is, one application may be capable of being classified as the first group, the second group, and the third group depending a state of the application. As an example, when a content is selected, the at least one processor 120 may identify a target group corresponding to the content among the plurality of predetermined groups based on a movement range of a field of view of the content.

The electronic apparatus 100 may provide an environment wherein a VR game that was enjoyed with a VR device can be used on a light field display.

The electronic apparatus 100 may show a 3D screen in a fixed location in a different manner from a VR device (e.g., a head mounted display device). The electronic apparatus 100 may selectively filter target data according to an application or perform a conversion operation for considering this. The electronic apparatus 100 may provide a content image which provides a sense of reality and a sense of immersion, and from which a sense of unfamiliarity was removed.

Figure 3:
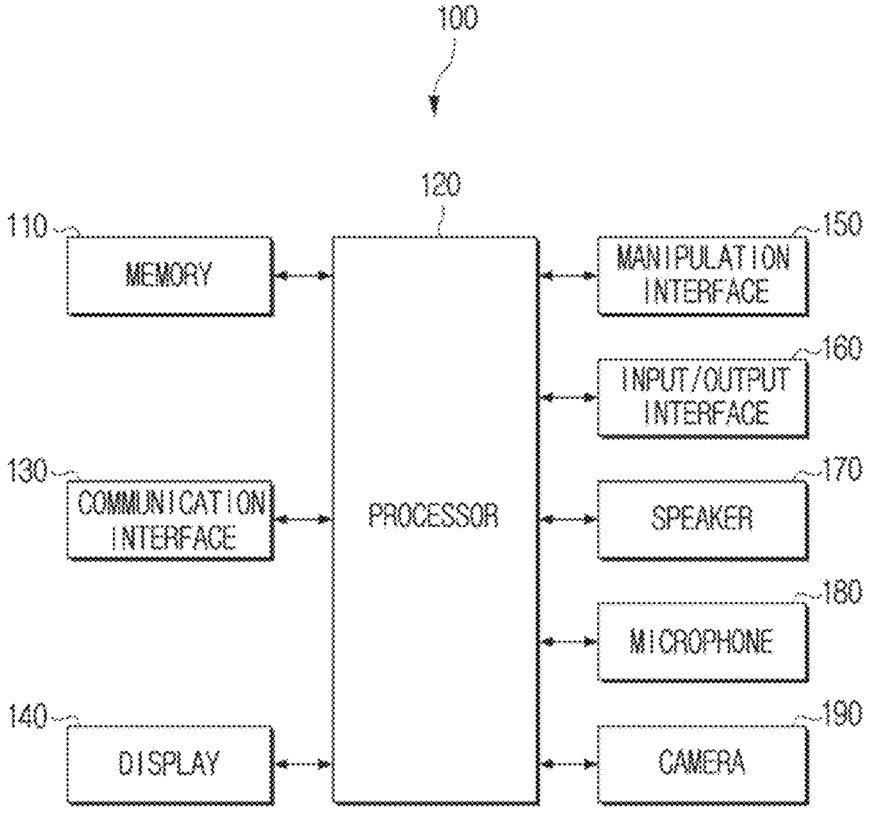
FIG. 3 is a block diagram for illustrating a detailed configuration of the electronic apparatus in FIG. 2 according to an embodiment.

FIG. 3 is a block diagram for illustrating a detailed configuration of the electronic apparatus 100 in FIG. 2 according to an embodiment.

Referring to FIG. 3, the electronic apparatus 100 may include at least one of memory 110, at least one processor 120, a communication interface 130, a display 140, a manipulation interface 150, an input/output interface 160, a speaker 170, a microphone 180, or a camera 190.

The memory 110 may be implemented as internal memory such as ROM (e.g., electrically erasable programmable read-only memory (EEPROM)), RAM, etc., included in the at least one processor 120, or implemented as separate memory from the at least one processor 120. In this case, the memory 110 may be implemented in the form of memory embedded in the electronic apparatus 100, or implemented in the form of memory that can be attached to or detached from the electronic apparatus 100 according to the use of stored data. For example, in the case of data for driving the electronic apparatus 100, the data may be stored in memory embedded in the electronic apparatus 100, and in the case of data for an extended function of the electronic apparatus 100, the data may be stored in memory that can be attached to or detached from the electronic apparatus 100.

In the case of memory embedded in the electronic apparatus 100, the memory may be implemented as at least one of volatile memory (e.g.: dynamic RAM (DRAM), static RAM (SRAM), or synchronous dynamic RAM (SDRAM), etc.) or non-volatile memory (e.g.: one time programmable ROM (OTPROM), programmable ROM (PROM), erasable and programmable ROM (EPROM), electrically erasable and programmable ROM (EEPROM), mask ROM, flash ROM, flash memory (e.g.: NAND flash or NOR flash, etc.), a hard drive, or a solid state drive (SSD)). In the case of memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), external memory that can be connected to a USB port (e.g., a USB memory), etc.

The memory 110 may store at least one instruction. The at least one processor 120 may perform various operations based on the instructions stored in the memory 110.

The at least one processor 120 may be implemented as a digital signal processor (DSP) processing digital signals, a microprocessor, and a time controller (TCON). However, the disclosure is not limited thereto, and the at least one processor 120 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. Also, the at least one processor 120 may be implemented as a system on chip (SoC) having a processing algorithm stored therein or large scale integration (LSI), or in the form of a field programmable gate array (FPGA). The at least one processor 120 may perform various functions by executing computer executable instructions stored in the memory 110.

The communication interface 130 is a component that performs communication with various types of external apparatuses according to various types of communication methods. The communication interface 130 may include a wireless communication module or a wired communication module. Each communication module may be implemented in a form of at least one hardware chip.

A wireless communication module may be a module that communicates with an external apparatus wirelessly. For example, a wireless communication module may include at least one module among a Wi-Fi module, a Bluetooth module, an infrared communication module, or other communication modules.

A Wi-Fi module and a Bluetooth module may perform communication by a Wi-Fi method and a Bluetooth method, respectively. In the case of using a Wi-Fi module or a Bluetooth module, various types of connection information such as a service set identifier (SSID) and a session key, etc. is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

Other communication modules may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

A wired communication module may be a module that communicates with an external apparatus via wire. For example, a wired communication module may include at least one of a local area network (LAN) module, an Ethernet module, a pair cable, a coaxial cable, an optical fiber cable, or an ultra wide-band (UWB) module.

According to an embodiment, the communication interface 130 may use the same communication module (e.g., a Wi-Fi module) for communicating with an external apparatus such as a remote control apparatus and an external server.

According to an embodiment, the communication interface 130 may use different communication modules for communicating with an external apparatus such as a remote control apparatus and an external server. For example, the communication interface 130 may use at least one of an Ethernet module or a Wi-Fi module for communicating with an external server, and use a Bluetooth module for communicating with an external apparatus such as a remote control apparatus. However, this is merely an example, and the communication interface 130 may use at least one communication module among various communication modules in the case of communicating with a plurality of external apparatuses or external servers.

The display 140 may be implemented as displays in various forms such as a liquid crystal display (LCD), an organic light emitting diodes (OLED) display, a plasma display panel (PDP), etc. Inside the display 140, a driving circuit that may be implemented in forms such as an amorphous silicon thin film transistor (a-si TFT), a low temperature poly silicon (LTPS) TFT, an organic TFT (OTFT), etc., and a backlight unit, etc. may also be included together. Also, the display 140 may be implemented as a touch screen combined with a touch sensor, a flexible display, a three-dimensional display (3D display), etc. In addition, the display 140 according to an embodiment of the disclosure may include not only a display panel outputting images, but also a bezel housing the display panel. In particular, a bezel according to an embodiment of the disclosure may include a touch sensor for detecting user interactions.

The manipulation interface 150 may be implemented as a device such as a button, a touch pad, a mouse, and a keyboard, or may be implemented as a touch screen that can perform the aforementioned display function and a manipulation input function together. A button may be various types of buttons such as a mechanical button, a touch pad, a wheel, etc. formed in any areas such as the front surface part or the side surface part, the rear surface part, etc. of the exterior of the main body of the electronic apparatus 100.

The input/output interface 160 may be any one interface among a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), and a digital visual interface (DVI). The input/output interface 160 may input or output at least one of an audio signal or a video signal. Depending on implementation examples, the input/output interface 160 may include a port inputting or outputting only audio signals and a port inputting or outputting only video signals as separate ports, or it may be implemented as one port that inputs or outputs both audio signals and video signals. The electronic apparatus 100 may transmit at least one of an audio signal or a video signal to an external apparatus (e.g., an external display apparatus or an external speaker) through the input/output interface 160. An output port included in the input/output interface 160 may be connected with an external apparatus, and the electronic apparatus 100 may transmit at least one of an audio signal or a video signal to the external apparatus through the output port.

The input/output interface 160 may be connected with the communication interface. The input/output interface 160 may transmit information received from an external apparatus to the communication interface, or transmit information received through the communication interface to an external apparatus.

The speaker 170 may be a component that outputs not only various kinds of audio data but also various kinds of notification sounds or voice messages, etc.

The microphone 180 is a component for receiving input of a user voice or other sounds, and converting them into audio data. The microphone 180 may receive a user's voice in an activated state. For example, the microphone 180 may be formed as an integrated type on the upper side or the front surface direction, the side surface direction, etc. of the electronic apparatus 100. The microphone 180 may include various components such as a microphone collecting a user voice in an analog form, an amp circuit amplifying the collected user voice, an A/D conversion circuit that samples the amplified user voice and converts the user voice into a digital signal, a filter circuit that removes noise components from the converted digital signal, etc.

The camera 190 is a component for photographing an object and generating a photographed image, and a photographed image is a concept including both of a moving image and a still image. The camera 190 may obtain an image for at least one external apparatus, and may be implemented as a visible light camera, a lens, an infrared sensor, or the like. According to an embodiment, the camera 190 may be a sensor that is operatively connected to the electronic apparatus 100.

According to an embodiment, the camera 190 may include a lens and an image sensor. As types of a lens, there are a general generic-purpose lens, an optical lens, a zoom lens, or the like, and the type may be determined according to the type, the characteristic, the use environment, etc. of the electronic apparatus 100. As the image sensor, a complementary metal oxide semiconductor (CMOS) and a charge coupled device (CCD), etc. may be used.

Figure 4:
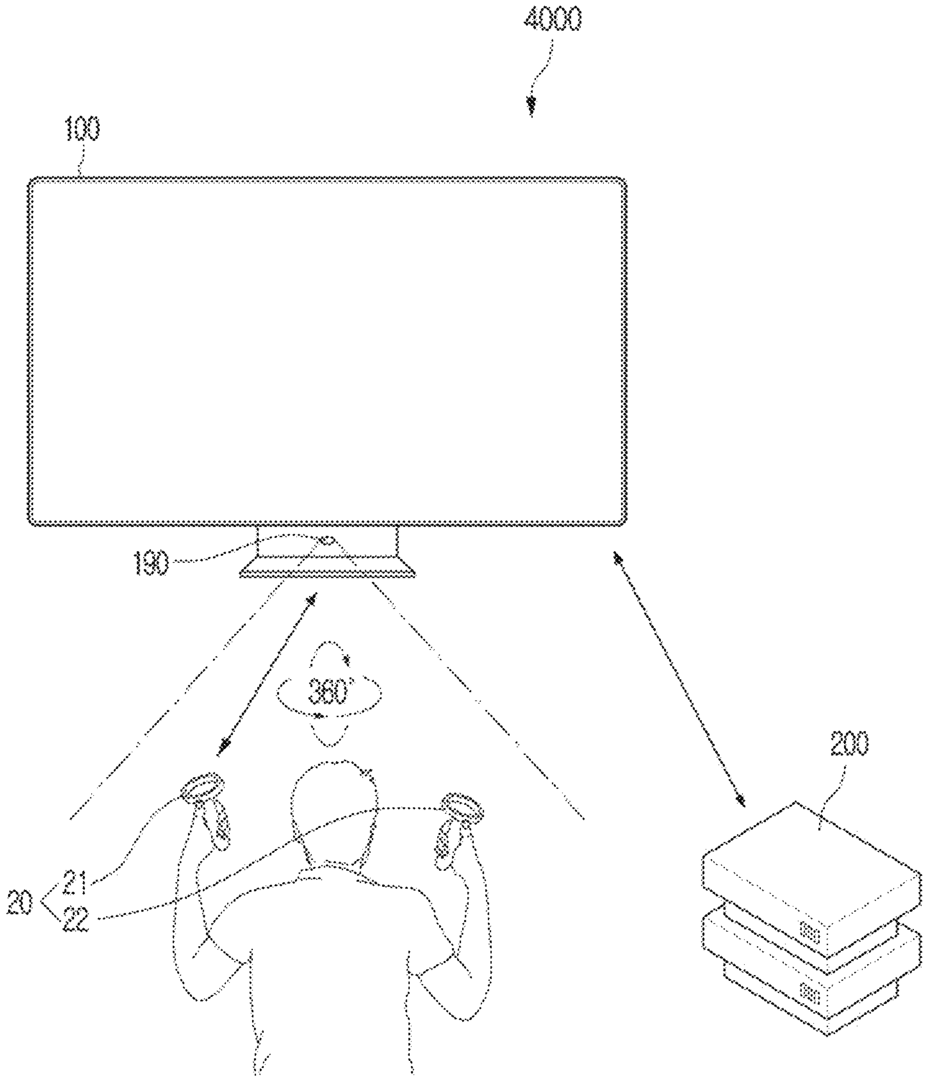
FIG. 4 is a diagram for illustrating a system including an electronic apparatus and a server according to an embodiment.

FIG. 4 is a diagram for illustrating a system 4000 including an electronic apparatus 100 and a server 200 according to an embodiment.

The system 4000 in FIG. 4 may include the electronic apparatus 100 and the server 200.

The server 200 may be an apparatus that provides services related to an application. The electronic apparatus 100 may be communicatively connected with the server 200 in executing an application. An application may provide a content limited to a case of being connected to the server 200.

The electronic apparatus 100 may transmit at least one of a photographed image including the user, motion data obtained from the photographed image, or filtered target data to the server 200.

The electronic apparatus 100 may be communicatively connected with the remote control apparatus 20. The electronic apparatus 100 may provide a signal received from the remote control apparatus 20 to the server 200. The server 200 may generate a content image corresponding to the signal generated by the remote control apparatus 20. The server 200 may transmit the content image to the electronic apparatus 100. The electronic apparatus 100 may display the received content image.

Figure 5:
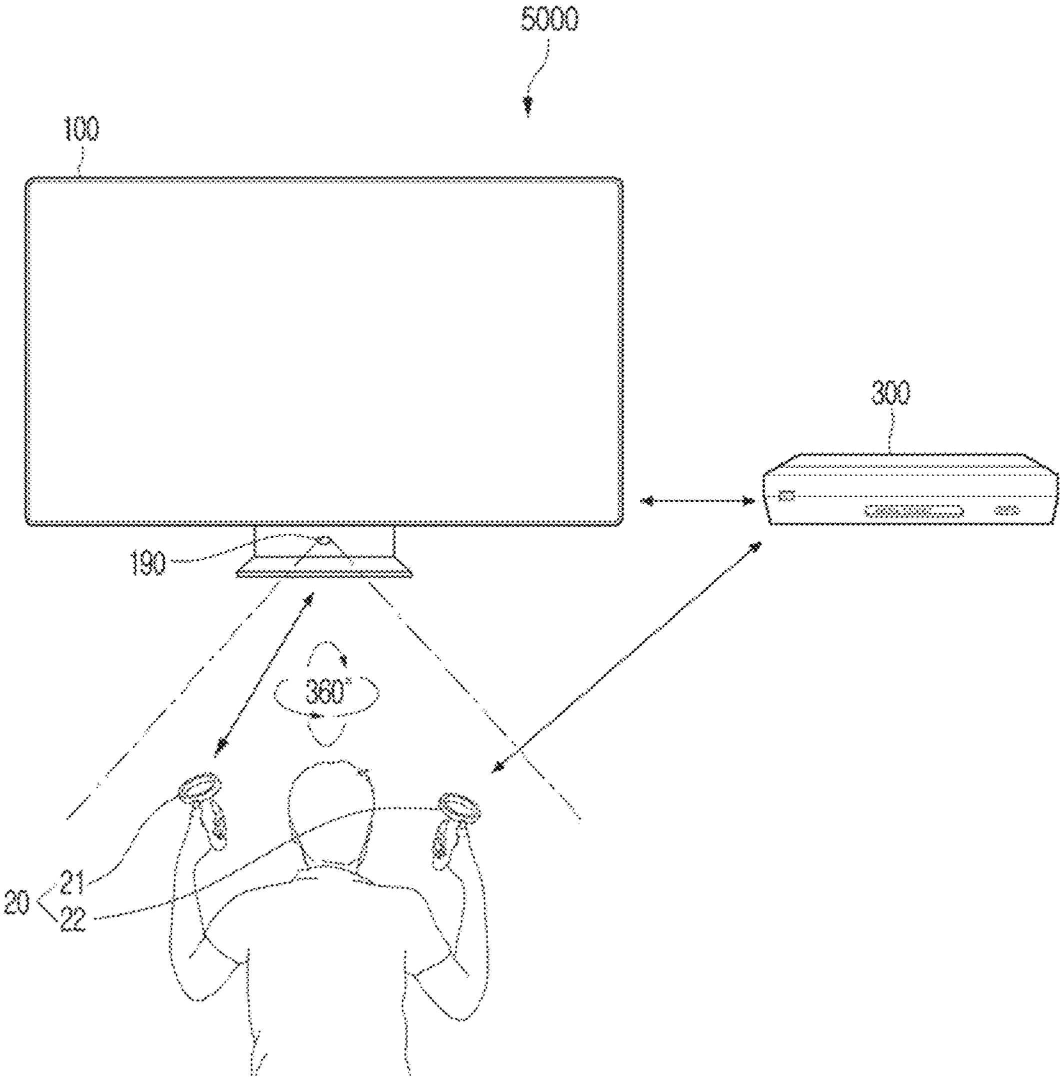
FIG. 5 is a diagram for illustrating a system including an electronic apparatus and a content providing apparatus according to an embodiment.

FIG. 5 is a diagram for illustrating a system 5000 including the electronic apparatus 100 and a content providing apparatus 300 according to an embodiment.

The system 5000 in FIG. 5 may include the electronic apparatus 100 and a content providing apparatus 300. The content providing apparatus 300 may be an apparatus that generates and provides a content image provided by an application.

The electronic apparatus 100 may request a content image to the content providing apparatus 300. The content providing apparatus 300 may transmit a content image to the electronic apparatus 100 in response to the request of the electronic apparatus 100. The electronic apparatus 100 may display the content image generated by the content providing apparatus 300.

The electronic apparatus 100 may transmit at least one of a photographed image including the user, motion data obtained from the photographed image, or filtered target data to the content providing apparatus 300. The content providing apparatus 300 may generate a content image.

The remote control apparatus 20 may be communicatively connected with the electronic apparatus 100 or the content providing apparatus 300.

As an example, the remote control apparatus 20 may be communicatively connected with the electronic apparatus 100. The electronic apparatus 100 may receive a control signal from the remote control apparatus 20. The electronic apparatus 100 may transmit the control signal received from the remote control apparatus 20 to the content providing apparatus 300. The content providing apparatus 300 may generate a content image corresponding to the control signal. The content providing apparatus 300 may transmit the content image to the electronic apparatus 100.

As an example, the remote control apparatus 20 may be communicatively connected with the content providing apparatus 300. The content providing apparatus 300 may receive a control signal from the remote control apparatus 20. The content providing apparatus 300 may generate a content image based on the control signal. The content providing apparatus 300 may transmit the content image to the electronic apparatus 100.

Figure 6:
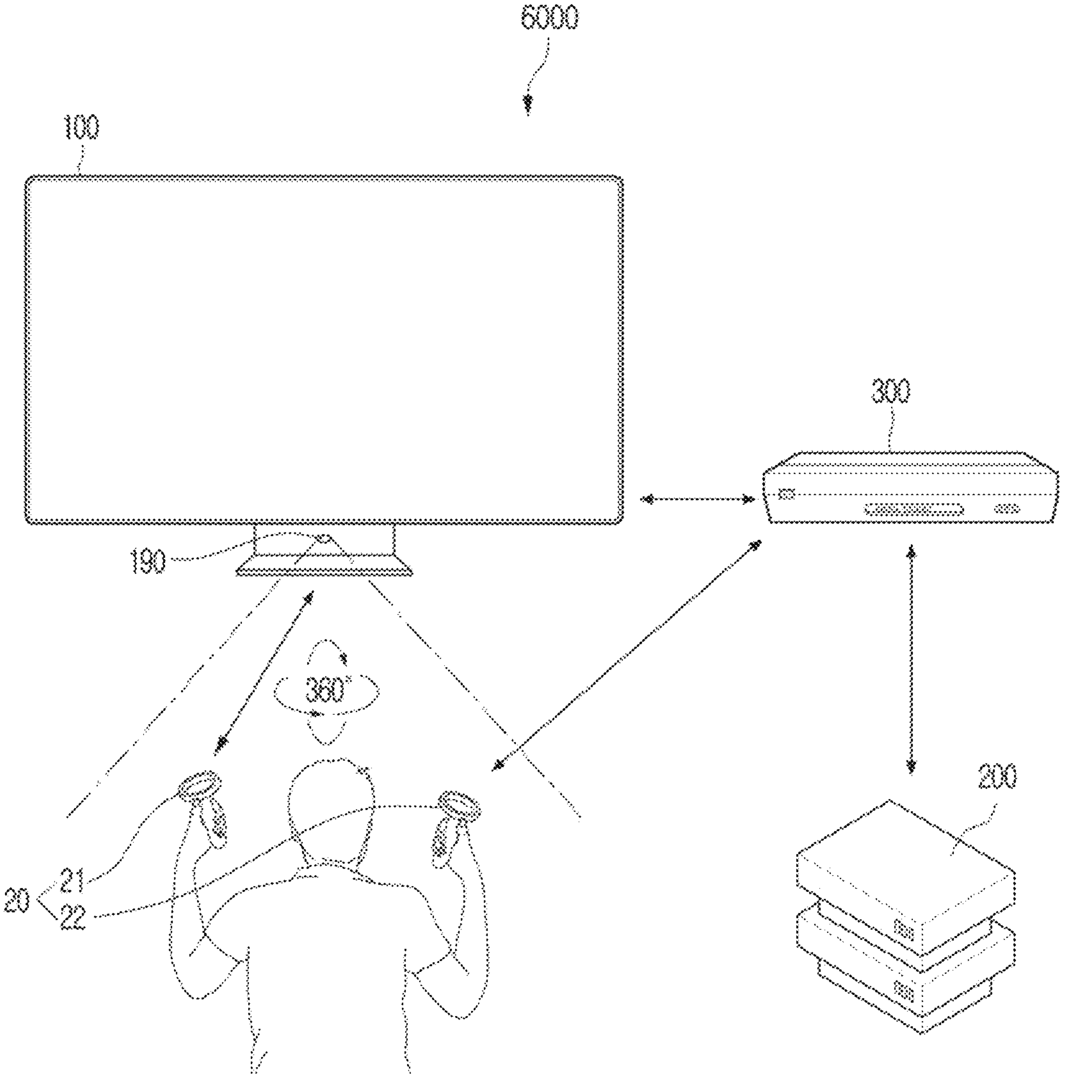
FIG. 6 is a diagram for illustrating a system including an electronic apparatus, a server, and a content providing apparatus according to an embodiment.

FIG. 6 is a diagram for illustrating a system 6000 including the electronic apparatus 100, the server 200, and the content providing apparatus 300 according to an embodiment.

The system 6000 may include the electronic apparatus 100, the server 200, and the content providing apparatus 300. The electronic apparatus 100 may be communicatively connected with the content providing apparatus 300. The content providing apparatus 300 may be connected with the server 200.

The server 200 may generate a content image and provide it to the content providing apparatus 300. The content providing apparatus 300 may transmit the content image to the electronic apparatus 100. The electronic apparatus 100 may provide the content image received from the content providing apparatus 300.

The remote control apparatus 20 may be communicatively connected with the electronic apparatus 100 or the content providing apparatus 300. Explanation in this regard may correspond to the description of FIG. 5, and redundant explanations will be omitted.

Figure 7:
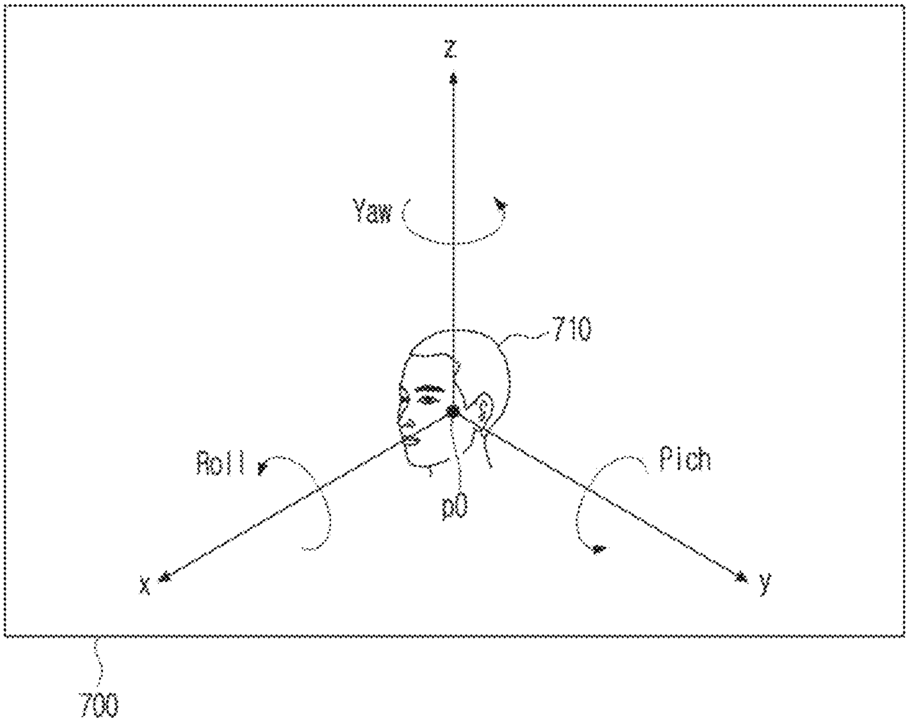
FIG. 7 is a diagram for illustrating a standard for locations and directions according to an embodiment.

FIG. 7 is a diagram for illustrating a standard for locations and directions according to an embodiment.

According to the embodiment 700 in FIG. 7, a 3D coordinate system may be indicated.

The 3D coordinate system may include an x axis, a y axis, and a z axis for indicating locations. However, the disclosure is not limited to this configuration.

The x axis may be a virtual axis that is along the front side and the rear side based on a reference point p0. As a subject 710 moves more to the front side from the reference point p0, the x value may increase. In an embodiment, as the subject 710 moves more to the rear side from the reference point p0, the x value may decrease.

The y axis may be a virtual axis that is along the left side and the right side based on the reference point p0. As the subject 710 moves more to the left side from the reference point p0, the y value may increase. In an embodiment, as the subject 710 moves more to the right side from the reference point p0, the y value may decrease.

The z axis may be a virtual axis that is along the upper side and the lower side based on the reference point p0. As the subject 710 moves more to the upper side from the reference point p0, the z value may increase. In an embodiment, as the subject 710 moves more to the lower side from the reference point p0, the z value may decrease.

The x axis, the y axis, and the z axis may be orthogonal to one another.

As an example, the x axis may be described as a first axis, the y axis may be described as a second axis, and the z axis may be described as a third axis.

The 3D coordinate system may include a roll, a pitch, and a yaw for indicating a rotation state of an object.

The roll may indicate an angle at which an object rotates centered around the x axis from the reference point p0.

It is assumed that the x axis is viewed from the reference point p0. As the subject 710 rotates more to a clockwise direction from the reference point p0, the roll value may increase. As the subject 710 rotates more to a counter-clockwise direction from the reference point p0, the roll value may decrease.

The pitch may indicate an angle at which an object rotates centered around the y axis from the reference point p0.

It is assumed that the y axis is viewed from the reference point p0. As the subject 710 rotates more to a clockwise direction from the reference point p0, the pitch value may increase. Meanwhile, as the subject 710 rotates more to a counter-clockwise direction from the reference point p0, the pitch value may decrease.

As the subject 710 is tilted more to the lower side from the reference point p0, the pitch value may increase. As the subject 710 is tilted more to the upper side from the reference point p0, the pitch value may decrease.

The yaw may indicate an angle at which an object rotates centered around the z axis from the reference point p0.

It is assumed that the z axis is viewed from the reference point p0. As the subject 710 rotates more to a clockwise direction from the reference point p0, the yaw value may increase. As the subject 710 rotates more to the left side from the reference point p0, the yaw value may increase.

As the subject 710 rotates more to a counter-clockwise direction from the reference point p0, the yaw value may decrease. As the subject 710 rotates more to the right side from the reference point p0, the yaw value may decrease.

As an example, the x axis may be described as a roll axis, the y axis may be described as a pitch axis, and the z axis may be described as a yaw axis.

As an example, the roll value may be described as a first rotation angle, the pitch value may be described as a second rotation angle, and the yaw value may be described as a third rotation angle.

As an example, an angle of rotating may be described as a rotation angle or a rotation direction.

Figure 8:
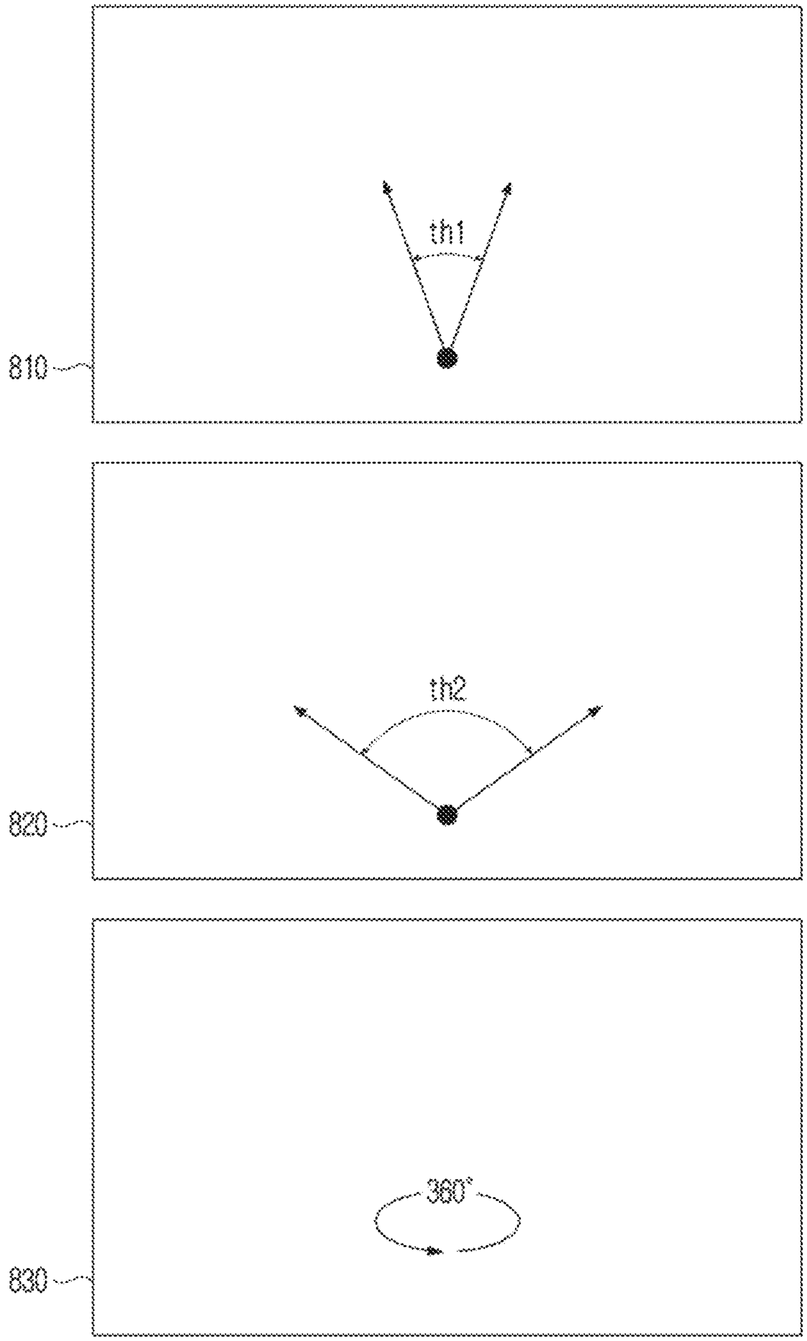
FIG. 8 is a diagram for illustrating field of views for each group of an application according to an embodiment.

FIG. 8 is a diagram for illustrating movement ranges of a field of view for each group of an application according to an embodiment.

Referring to FIG. 8, an application provided in the electronic apparatus 100 may provide screens of various movement ranges of a field of view. The electronic apparatus 100 may classify the application into predetermined groups based on movement ranges of a field of view that can be provided in the application.

The embodiment 810 in FIG. 8 may indicate that the movement range of a field of view is the first threshold angle th1. If the movement range of a field of view is smaller than or equal to the first threshold angle th1, the electronic apparatus 100 may classify the application as the first group.

The embodiment 820 in FIG. 8 may indicate that the movement range of a field of view is the second threshold angle th2. If the movement range of a field of view exceeds the first threshold angle th1 and is smaller than or equal to the second threshold angle th2, the electronic apparatus 100 may classify the application as the second group.

The embodiment 830 in FIG. 8 may indicate that the movement range of a field of view is 360 degrees. If the movement range of a field of view exceeds the second threshold angle th2, the electronic apparatus 100 may classify the application as the third group.

FIG. 9 is a diagram for illustrating applications for each group according to an embodiment.

The embodiment 910 in FIG. 9 may be a screen provided by an application included in the first group. The application may provide a content whose movement range of a field of view is smaller than or equal to the first threshold angle.

The embodiment 920 in FIG. 9 may be a screen provided by an application included in the second group. The application may provide a content whose movement range of a field of view exceeds the first threshold angle and is smaller than or equal to the second threshold angle.

The embodiment 930 in FIG. 9 may be a screen provided by an application included in the third group. The application may provide a content whose movement range of a field of view exceeds the second threshold angle.

FIG. 10 is a diagram for illustrating a group table according to an embodiment.

The table of groups of movement ranges of a field of view 1010 in FIG. 10 may indicate groups that are classified according to movement ranges of a field of view. The table of groups of movement ranges of a field of view 1010 may include movement ranges of a field of view corresponding to each of the plurality of groups. Also, the table of groups of movement ranges of a field of view 1010 may include a standard for movement ranges of a field of view for classifying movement ranges of a field of view as one group among the plurality of groups.

If a movement range of a field of view is smaller than or equal to the first threshold angle th1, the electronic apparatus 100 may classify the application as the first group. If a movement range of a field of view exceeds the first threshold angle th1 and is smaller than or equal to the second threshold angle th2, the electronic apparatus 100 may classify the application as the second group. If a movement range of a field of view exceeds the second threshold angle th2, the electronic apparatus 100 may classify the application as the third group.

The table of groups of applications 1020 in FIG. 10 may indicate groups corresponding to identification information of applications. The table of groups of applications 1020 may include information wherein applications and groups corresponding to the applications are mapped. The applications may be divided by the identification information. The electronic apparatus 100 may specify the first application as the first identification information, and specify the second application as the second identification information.

The table of groups of applications 1020 may include at least one of identification information corresponding to each application, movement ranges of a field of view, groups, or additional information.

As an example, the table of groups of applications 1020 may include additional information indicating that movement of the field of view of the first application #01 is impossible.

Also, as an example, the table of groups of applications 1020 may include additional information indicating that the field of view of the fifth application #05 can be moved in 360 degrees.

Figure 11:
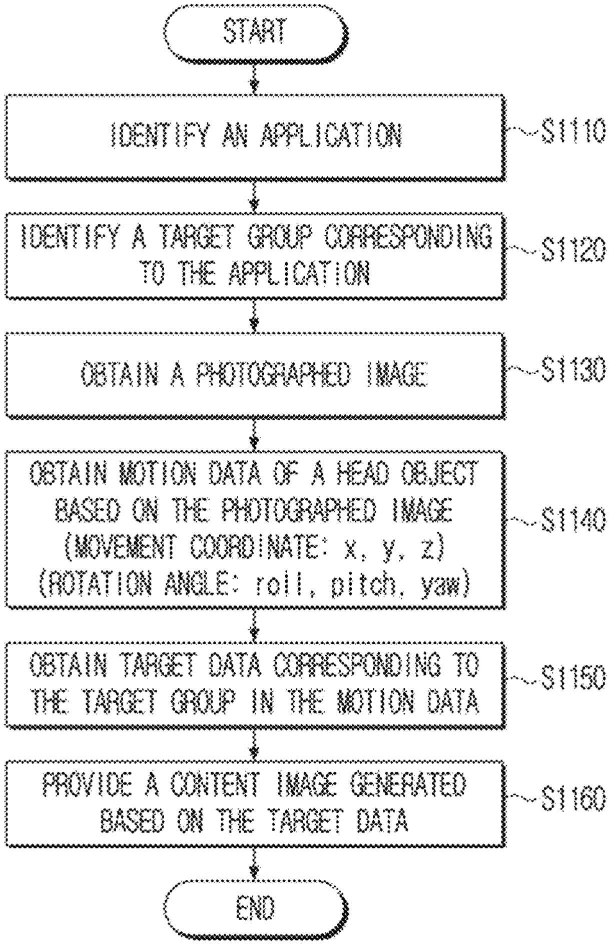
FIG. 11 is a diagram for illustrating an operation of photographing a user and providing a content image according to an embodiment.

FIG. 11 is a diagram for illustrating an operation of photographing a user and providing a content image according to an embodiment.

Referring to FIG. 11, the electronic apparatus 100 may identify an application in the step S1110. The electronic apparatus 100 may identify an application that provides a content image to be displayed on the display 140.

As an example, an application may be identified by the user's selection. The electronic apparatus 100 may receive a user input selecting an application. The electronic apparatus 100 may identify an application selected based on the user input.

As an example, an application may have been already being executed. The electronic apparatus 100 may identify the application that is currently being executed.

The electronic apparatus 100 may identify a target group corresponding to the application in the step S1120. The electronic apparatus 100 may identify a target group corresponding to the identified (or selected) application. The electronic apparatus 100 may identify a target group by various methods. An embodiment of identifying a target group will be described in FIG. 12 to FIG. 16.

The electronic apparatus 100 may obtain a photographed image in the step S1130. The electronic apparatus 100 may obtain a photographed image by using the camera 190. The electronic apparatus 100 may obtain a photographed image by using the camera 190 arranged on the same plane with the display 140. The direction in which the display 140 outputs a light and the direction in which the camera 190 photographs an object may be identical.

The electronic apparatus 100 may identify a human object based on the photographed image. The electronic apparatus 100 may store in advance characteristic data indicating a human object. The electronic apparatus 100 may identify a human object in the photographed image based on the pre-stored characteristic data.

The electronic apparatus 100 may identify a head object based on the photographed image. The electronic apparatus 100 may store in advance characteristic data indicating a head object. The electronic apparatus 100 may identify a head object in the photographed image based on the pre-stored characteristic data.

The electronic apparatus 100 may identify a predetermined object instead of a human object or a head object.

The electronic apparatus 100 may obtain motion data of a head object based on the photographed image in the step S1140. The electronic apparatus 100 may identify a head object in the photographed image. The electronic apparatus 100 may obtain a plurality of photographed images. The electronic apparatus 100 may obtain motion data of the head object based on the plurality of photographed images. The electronic apparatus 100 may obtain motion data indicating the head object in each of the plurality of photographed images. The electronic apparatus 100 may obtain motion data indicating a movement of the head object in the photographed image. The electronic apparatus 100 may track a real-time movement of the head object based on the plurality of photographed images.

The motion data may include at least one of a movement coordinate or a rotation angle. A movement coordinate may include at least one of an x value, a y value, or a z value. A rotation angle may include at least one of a roll value, a pitch value, or a yaw value.

As an example, the motion data may include an x value, a y value, a z value, a roll value, a pitch value, and a yaw value indicating a movement coordinate and a rotation angle.

The electronic apparatus 100 may obtain target data corresponding to the target group in the motion data in the step S1150. The electronic apparatus 100 may obtain target data corresponding to the target group among the plurality of data included in the motion data. The target data may vary for each group. A method of obtaining target data will be described in FIG. 17.

The electronic apparatus 100 may provide a content image generated based on the target data in the step S1160. The application may generate a content image based on the target data. The target data may include at least one data in the motion data. The motion data may be information indicating the head object. The target data may include information indicating a movement of the head object. The head object may indicate a body part of the user. The target data may indicate a movement of the user. The application may generate a content image based on the user's movement.

As an example, the head object may be described as a human object or a face object.

The electronic apparatus 100 may obtain the content image generated by the application based on the target data. The electronic apparatus 100 may provide the content image.

As an example, the electronic apparatus 100 may display the content image through the display 140.

Figure 12:
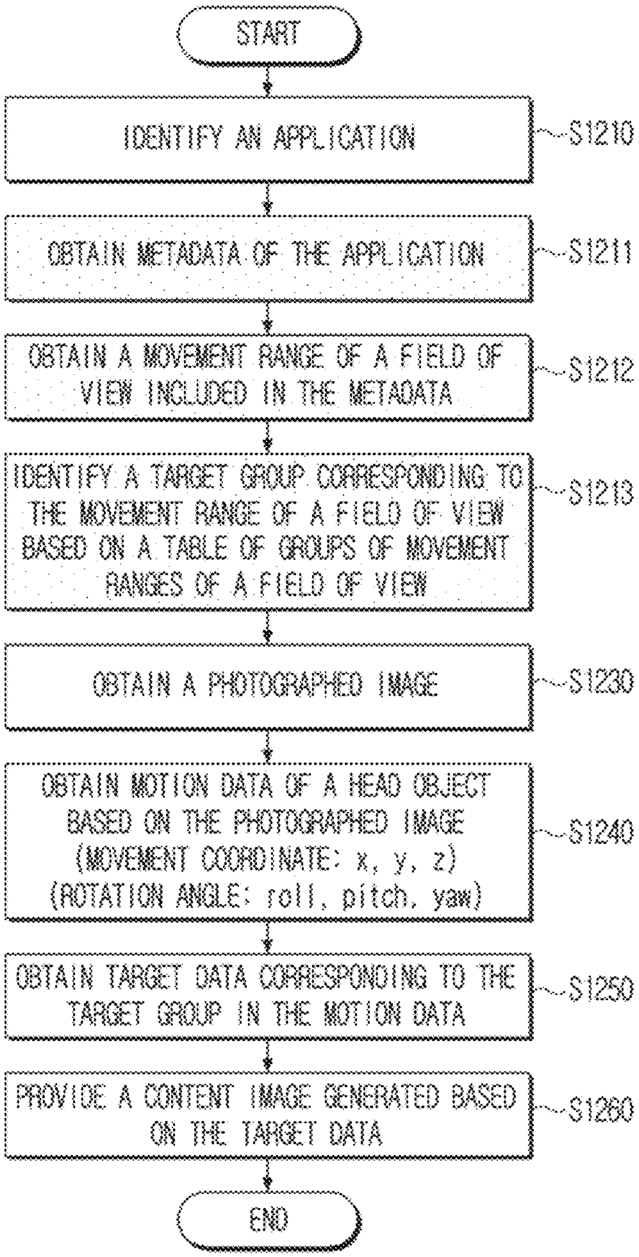
FIG. 12 is a diagram for illustrating an operation of identifying a target group with a field of view included in metadata according to an embodiment.

FIG. 12 is a diagram for illustrating an operation of identifying a target group with a field of view included in metadata according to an embodiment.

The steps S1210, S1230, S1240, S1250, and S1260 in FIG. 12 may correspond to the steps S1110, S1130, S1140, S1150, and S1160 in FIG. 11. Accordingly, overlapping explanation will be omitted.

After the application is identified, the electronic apparatus 100 may obtain metadata of the application in the step S1211. The metadata of the application may include various types of information related to the application.

As an example, the metadata may include at least one of identification information of the application, a movement range of a field of view, or additional information.

The electronic apparatus 100 may obtain the movement range of a field of view included in the metadata in the step S1212. The electronic apparatus 100 may identify a target group corresponding to the application based on the table of groups of movement ranges of a field of view 1010 in FIG. 10 in the step S1213.

After identifying the target group, the electronic apparatus 100 may perform the steps S1230, S1240, S1250, and S1260.

As an example, the metadata may include group information classified in advance. If group information is included in the metadata, the electronic apparatus 100 may identify a target group based on the metadata.

Figure 13:
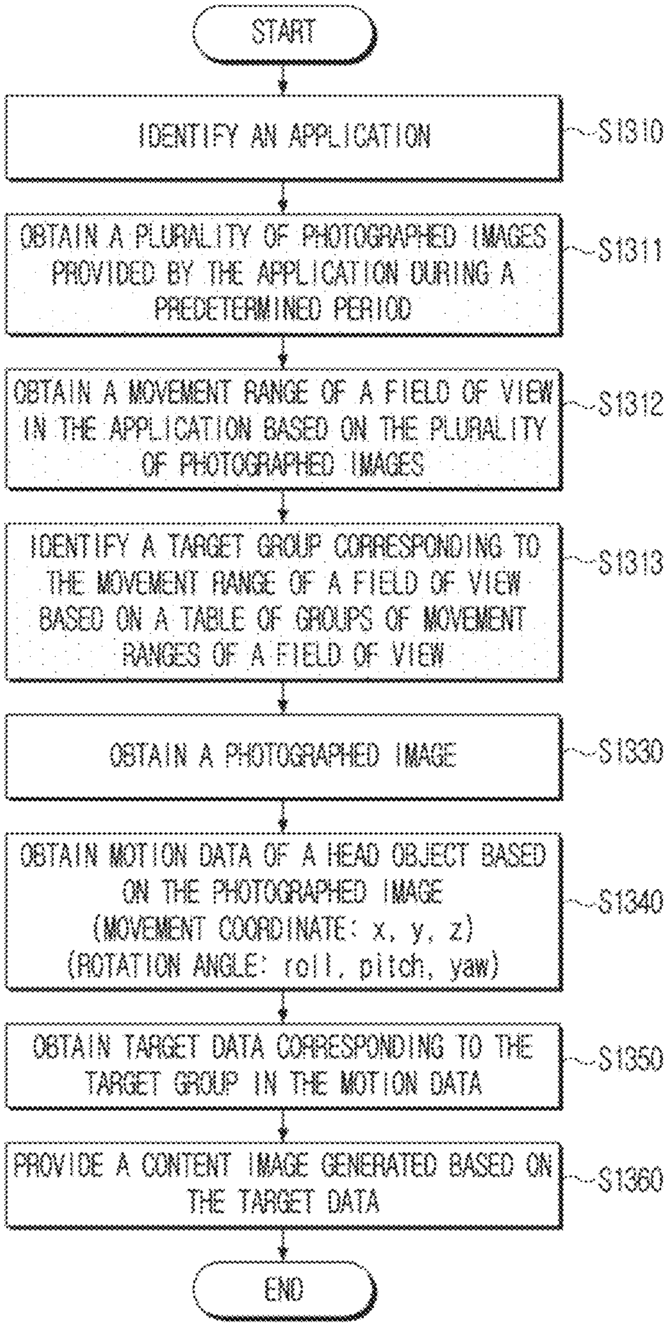
FIG. 13 is a diagram for illustrating an operation of identifying a target group with a field of view obtained based on a plurality of images according to an embodiment.

FIG. 13 is a diagram for illustrating an operation of identifying a target group with a movement range of a field of view obtained based on a plurality of images according to an embodiment.

The steps S1310, S1330, S1340, S1350, and S1360 in FIG. 13 may correspond to the steps S1110, S1130, S1140, S1150, and S1160 in FIG. 11. Accordingly, overlapping explanation will be omitted.

The electronic apparatus 100 may obtain a plurality of images provided by an application during a predetermined period in the step S1311. The electronic apparatus 100 may obtain a plurality of photographed images through the camera 190. The predetermined period may be changed according to the user's setting. Also, the predetermined period may be set as a sufficient period for analyzing a movement range of a field of view that can be provided by the application.

The electronic apparatus 100 may obtain the movement range of a field of view of the application based on the plurality of photographed images in the step S1312.

The electronic apparatus 100 may identify a target group corresponding to the movement range of a field of view based on the table of groups of movement ranges of a field of view 1010 in FIG. 10 in the step S1313.

After identifying the target group, the electronic apparatus 100 may perform the steps S1330, S1340, S1350, and S1360.

Figure 14:
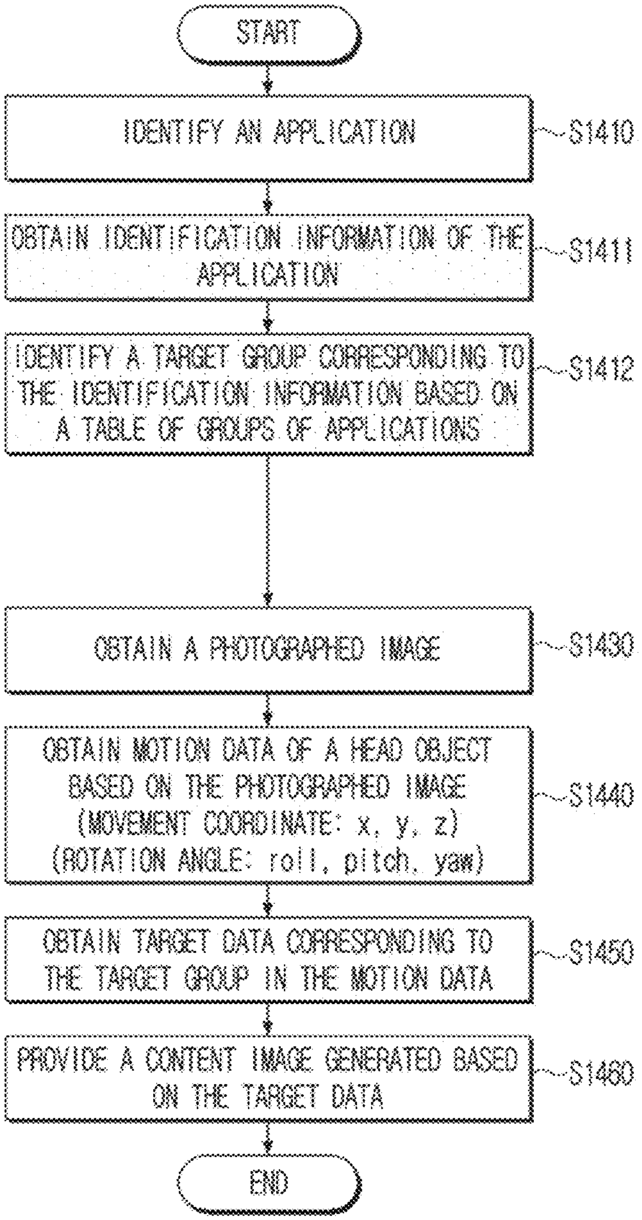
FIG. 14 is a diagram for illustrating an operation of identifying a target group with identification information of an application according to an embodiment.

FIG. 14 is a diagram for illustrating an operation of identifying a target group with identification information of an application according to an embodiment.

The steps S1410, S1430, S1440, S1450, and S1460 in FIG. 14 may correspond to the steps S1110, S1140, S1140, S1150, and S1160 in FIG. 11. Accordingly, overlapping explanation will be omitted.

The electronic apparatus 100 may obtain identification information of an application in the step S1411. The electronic apparatus 100 may identify a target group corresponding to the identification information based on the table of groups of applications 1020 in FIG. 10 in the step S1412.

After identifying the target group, the electronic apparatus 100 may perform the steps S1430, S1440, S1450, and S1460.

Figure 15:
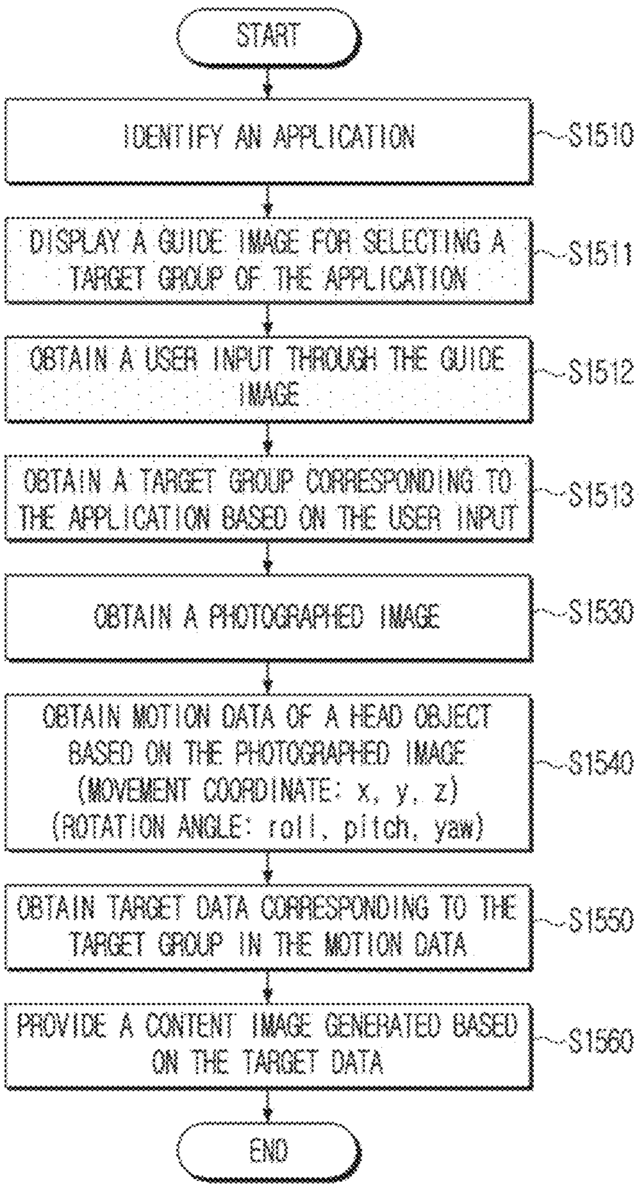
FIG. 15 is a diagram for illustrating an operation of identifying a target group with a user input according to an embodiment.

FIG. 15 is a diagram for illustrating an operation of identifying a target group with a user input according to an embodiment.

The steps S1510, S1530, S1540, S1550, and S1560 in FIG. 15 may correspond to the steps S1110, S1150, S1150, S1150, and S1160 in FIG. 11. Accordingly, overlapping explanation will be omitted.

The electronic apparatus 100 may display a guide image for selecting a target group of an application in the step S1511. As an example, the electronic apparatus 100 may display a guide image through the display 140. Explanation related to a guide image will be described in FIG. 16.

The electronic apparatus 100 may obtain a user input through the guide image in the step S1512. The electronic apparatus 100 may obtain (or receive) a user input for selecting one of a plurality of groups included in the guide image.

The electronic apparatus 100 may obtain a target group corresponding to the application based on the user input in the step S1513.

After identifying the target group, the electronic apparatus 100 may perform the steps S1530, S1540, S1550, and S1560.

If a target group is selected based on a user input, the actual movement range of a field of view that can be provided by the application may not be considered. The electronic apparatus 100 may identify a group selected by the user as the target group regardless of the movement range of a field of view of the application.

Figure 16:
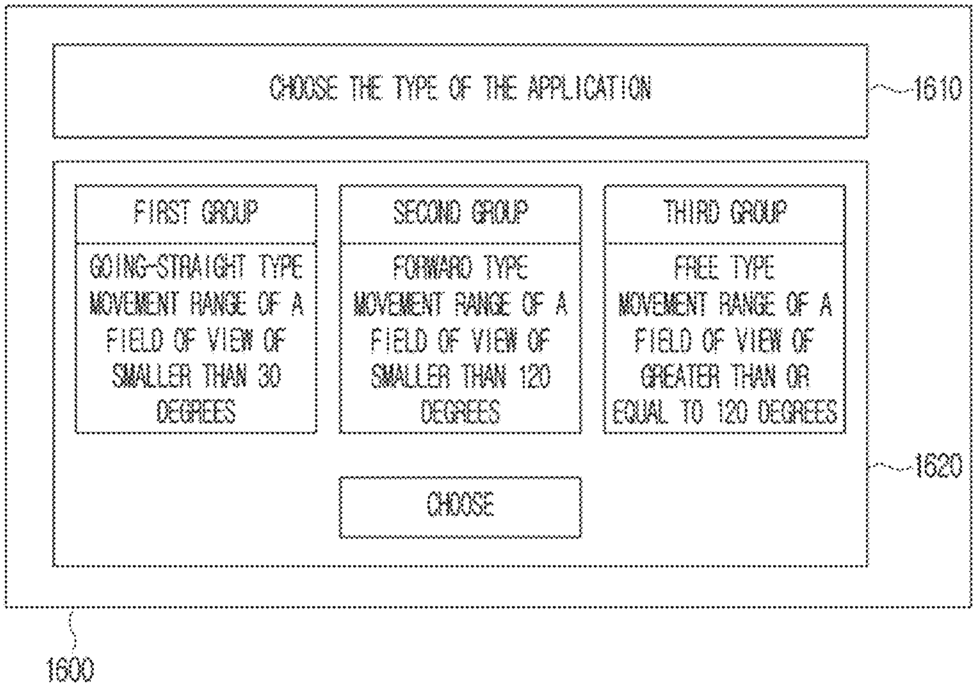
FIG. 16 is a diagram for illustrating a guide screen related to a target group according to an embodiment.

FIG. 16 is a diagram for illustrating a guide screen related to a target group according to an embodiment.

Referring to FIG. 16, the electronic apparatus 100 may provide (or display) a guide image 1600. The guide image 1600 may include guide information for selecting one group among a plurality of groups.

The guide image 1600 may include at least one of a guide UI 1610 or a selection UI 1620.

The guide UI 1610 may include text information for guiding to select one group.

The selection UI 1620 may include at least one group that can be selected by the user. Also, the selection UI 1620 may include explanation information corresponding to the group.

The electronic apparatus 100 may receive a user input for selecting one group among the plurality of groups through the guide image 1600.

As an example, a movement range of a field of view of an application may be designated.

FIG. 17 is a diagram for illustrating tables of target data for each group according to an embodiment.

The table of target data for each group 1710 in FIG. 17 may indicate target data corresponding to each group. The types of target data may vary for each group. The target data may include at least one of a movement coordinate or a rotation angle.

A movement coordinate may include at least one of an x value, a y value, or a z value.

A rotation angle may include at least one of a roll value, a pitch value, or a yaw value.

The target data may include at least one of an x value, a y value, a z value, a roll value, a pitch value, or a yaw value.

Which values or which types of data will be included in the target data may be determined by a target group.

The tables of target data for each group 1710, 1720 may include information indicating target data for each group.

As an example, target data corresponding to the first group may include an x value, a y value, or a z value.

Also, as an example, target data corresponding to the second group may include an x value, a y value, a z value, a pitch value, and a yaw value.

In addition, as an example, target data corresponding to the third group may include an x value, a y value, a z value, a pitch value, and a yaw value.

The table of target data of the first type 1710 may divide each of the x value, the y value, the z value, the roll value, the pitch value, and the yaw value into separate items. Also, the table of target data of the first type 1710 may include data (O, X) indicating whether the divided items are included.

The table of target data of the second type 1720 may include information indicating the types of target data for each group.

The target data corresponding to the first group may include only a movement coordinate. The target data corresponding to the first group may not include a rotation angle. This is for not reflecting a rotation angle for an application having a low (or narrow) movement range of a field of view.

The target data corresponding to the second group and the third group may not include the roll value. This is for not providing screen conversion of being changed to the roll value to the user.

According to another embodiment, the target data corresponding to the third group may include all of the x value, the y value, the z value, the roll value, the pitch value, and the yaw value. According to still another embodiment, if an application corresponds to the third group, target data including all of the x value, the y value, the z value, the roll value, the pitch value, and the yaw value may be used.

Figure 18:
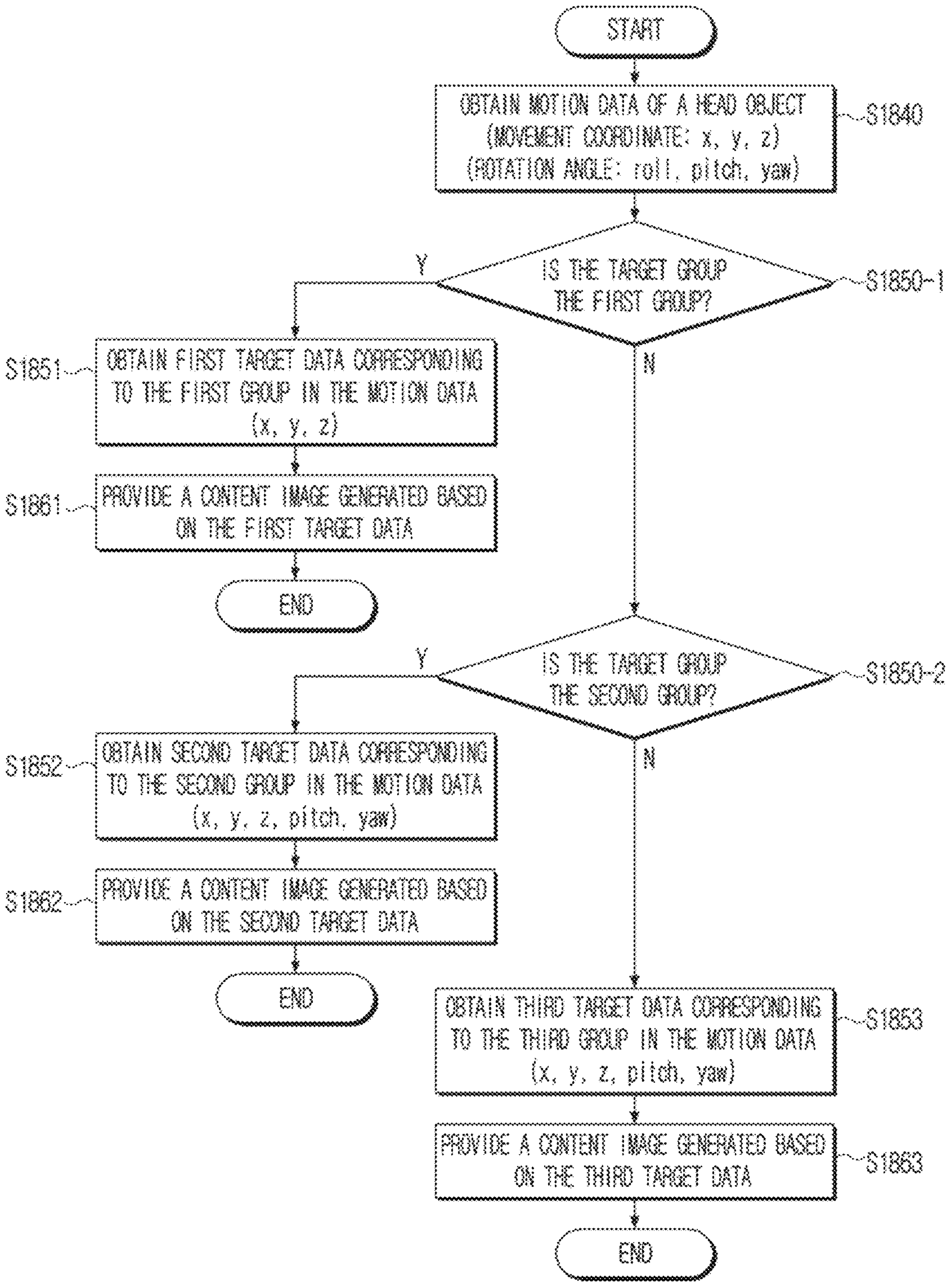
FIG. 18 is a diagram for illustrating an operation of processing target data for each group according to an embodiment.

FIG. 18 is a diagram for illustrating an operation of processing target data for each group according to an embodiment.

The step S1840 in FIG. 18 may correspond to the step S1140 in FIG. 11. Accordingly, overlapping explanation will be omitted.

After motion data is obtained, the electronic apparatus 100 may identify whether the target group is the first group in the step S1850-1.

If the target group is the first group in the step S1850-1-Y, the electronic apparatus 100 may obtain the first target data corresponding to the first group in the motion data in the step S1851. As an example, the first target data may include an x value, a y value, and a z value. The electronic apparatus 100 may provide a content image generated based on the first target data in the step S1861.

If the target group is not the first group in the step S1850-1-N, the electronic apparatus 100 may identify whether the target group is the second group in the step S1850-2.

If the target group is the second group in the step S1850-2-Y, the electronic apparatus 100 may obtain the second target data corresponding to the second group in the motion data in the step S1852. As an example, the second target data may include an x value, a y value, a z value, a pitch value, and a yaw value. The electronic apparatus 100 may provide a content image generated based on the second target data in the step S1862.

If the target group is not the second group in the step S1850-2-N, the electronic apparatus 100 may obtain the third target data corresponding to the third group in the motion data. As an example, the third target data may include an x value, a y value, a z value, a pitch value, and a yaw value. The electronic apparatus 100 may provide a content image generated based on the third target data in the step S1863.

FIG. 19 is a diagram for illustrating a conversion table corresponding to a third group according to an embodiment.

The data conversion table 1900 in FIG. 19 may include information for converting target data corresponding to the third group. When the third target data corresponding to the third group is received, the electronic apparatus 100 may convert the third target data.

The data conversion table 1900 may include a calculation formula that is converted according to the types of target data.

As an example, an x value, a y value, and a z value may not be converted.

Also, as an example, a yaw value may be converted into a yaw value+a y value*a. According to an embodiment, a may be a predetermined constant. Also, a may be a constant for correcting the yaw value based on the y value. Further, a may be a negative number.

It is assumed that a is a negative number, and the y value moves in two directions. The yaw value may be corrected in a counter-clockwise direction in the direction toward the z axis from the reference point p0 in FIG. 7.

As an example, a pitch value may be converted into a pitch value+a z value*b. b may be a predetermined constant. Also, b may be a constant for correcting the pitch value based on the z value. Further, b may be a positive number.

It is assumed that b is a positive number, and the z value moves in two directions. The pitch value may be corrected in a clockwise direction in the direction toward the z axis from the reference point p0 in FIG. 7.

An operation of correcting a pitch value and a yaw value will be described in FIG. 29 to FIG. 33.

Figure 20:
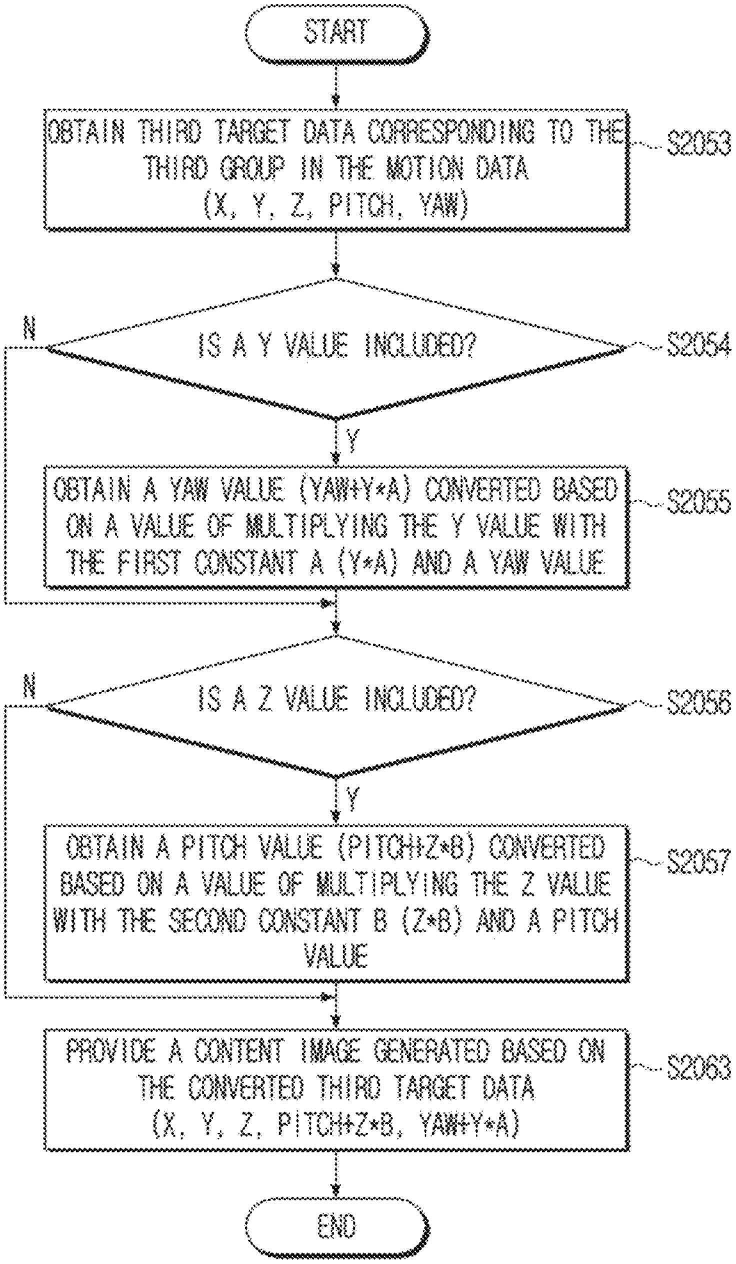
FIG. 20 is a diagram for illustrating an operation of performing conversion calculation of third target data corresponding to a third group according to an embodiment.

FIG. 20 is a diagram for illustrating an operation of performing conversion calculation of third target data corresponding to a third group according to an embodiment.

The step S2053 in FIG. 20 may correspond to the step S1853 in FIG. 18.

Accordingly, overlapping explanation will be omitted.

After the third target data is obtained, the electronic apparatus 100 may identify whether a y value is included in the third target data in the step S2054.

If a y value is not included in the third target data in the step S2054-N, the electronic apparatus 100 may identify whether a z value is included in the third target data in the step S2056.

If a y value is included in the third target data in the step S2054-Y, the electronic apparatus 100 may obtain a yaw value (yaw+y*a) converted based on a value of multiplying the y value with the first constant a (e.g., y*a) and a yaw value in the step S2055. The electronic apparatus 100 may obtain the converted yaw value by summing up the value of multiplying the y value with the first constant a (e.g., y*a) and the yaw value. The electronic apparatus 100 may correct the yaw value to the value of multiplying the y value with the first constant a (e.g., y*a).

The electronic apparatus 100 may identify whether a z value is included in the third target data in the step S2056.

If a z value is included in the third target data in the step S2056-Y, the electronic apparatus 100 may obtain a converted pitch value (pitch+z*b) converted based on a value of multiplying the z value with the second constant b (e.g., z*b) and a pitch value in the step S2057. The electronic apparatus 100 may obtain the converted pitch value by summing up the value of multiplying the z value with the second constant b (e.g., z*b) and the pitch value. The electronic apparatus 100 may correct the pitch value to the value of multiplying the z value with the second constant b (e.g., z*b).

The electronic apparatus 100 may provide a content image generated based on the converted third target data in the step S2063. As an example, the converted third target data may include the x value, the y value, the z value, the yaw value+the y value*a, and the pitch value+the z value*b. The electronic apparatus 100 may obtain the content image generated based on the converted (or corrected) third target data.

As an example, the steps S2054 and S2056 may be omitted. If the y value or the z value is not included in the third target data, the y value or the z value may be 0. In the calculation method performed in the steps S2055 and S2057, even if 0 is applied for the y value or the z value, the final third target data may be obtained.

Figure 21:
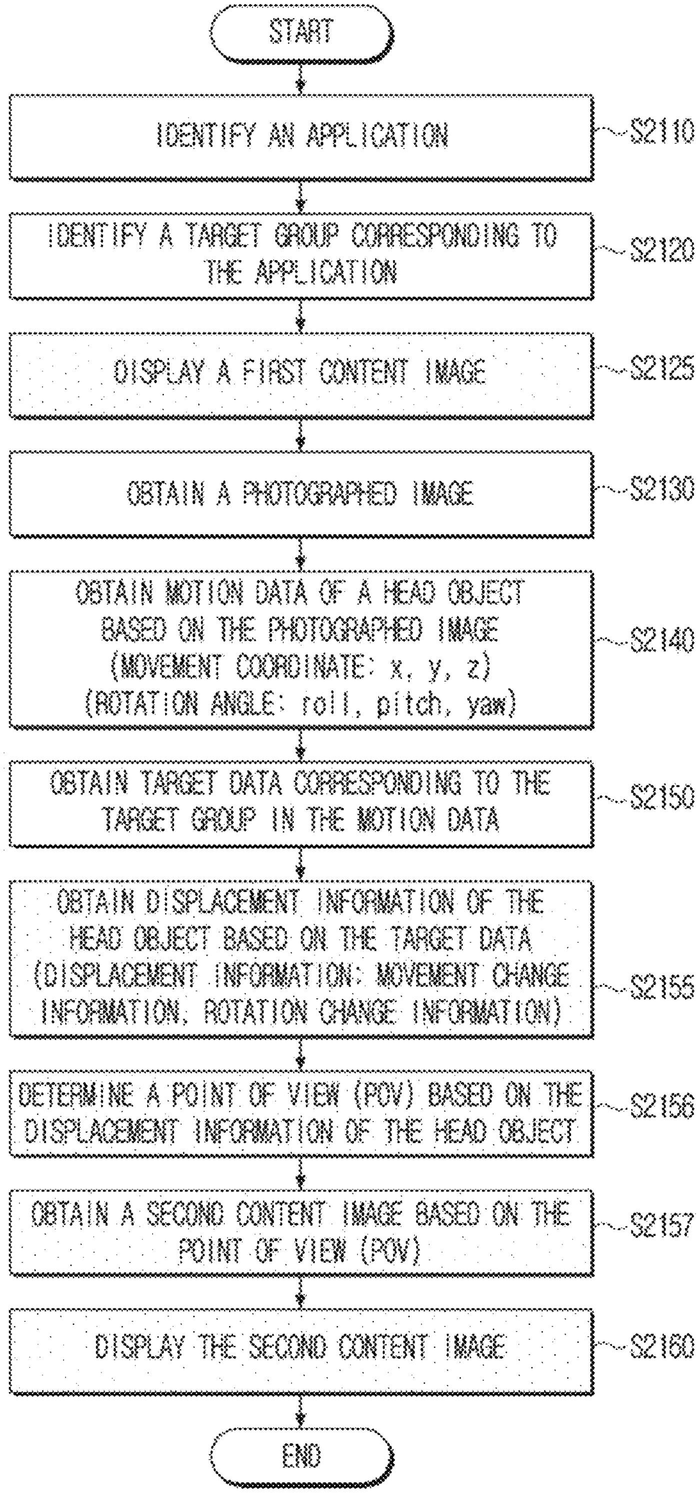
FIG. 21 is a diagram for illustrating an operation of providing a content image by using displacement information according to an embodiment.

FIG. 21 is a diagram for illustrating an operation of providing a content image by using displacement information according to an embodiment.

The steps S2110, S2120, S2130, S2140, and S2150 in FIG. 21 may correspond to the steps S1110, S1120, S1130, S1140, and S1150 in FIG. 11. Accordingly, overlapping explanation will be omitted.

After the target group is identified, the electronic apparatus 100 may display the first content image in the step S2125. The electronic apparatus 100 may display the first content image through the display 140.

After the first content image is displayed, the electronic apparatus 100 may perform the steps S2130, S2140, and S2150.

When the target data is obtained, the electronic apparatus 100 may obtain displacement information of a head object based on the target data in the step S2155. The displacement information may include at least one of movement change information or rotation change information. Also, the displacement information may include information indicating a change of a movement of the head object. The movement change information may indicate information indicating a change of a movement coordinate of the head object. The rotation change information may indicate information indicating a change of a rotation angle of the head object.

As an example, the displacement information may include a concept indicating a location and a direction.

The electronic apparatus 100 may determine a point of view (POV) based on the displacement information of the head object in the step S2156. If there was a movement in the head object, a point of view of a screen (or an image) provided by an application may be changed. The application may generate a new screen (or image) with the changed point of view.

The electronic apparatus 100 may obtain the second content image based on the point of view in the step S2157. The application may generate the second content image based on the point of view of a subject which becomes the standard.

The electronic apparatus 100 may display the second content image in the step S2160. The electronic apparatus 100 may display the second content image through the display 140.

Figure 22:
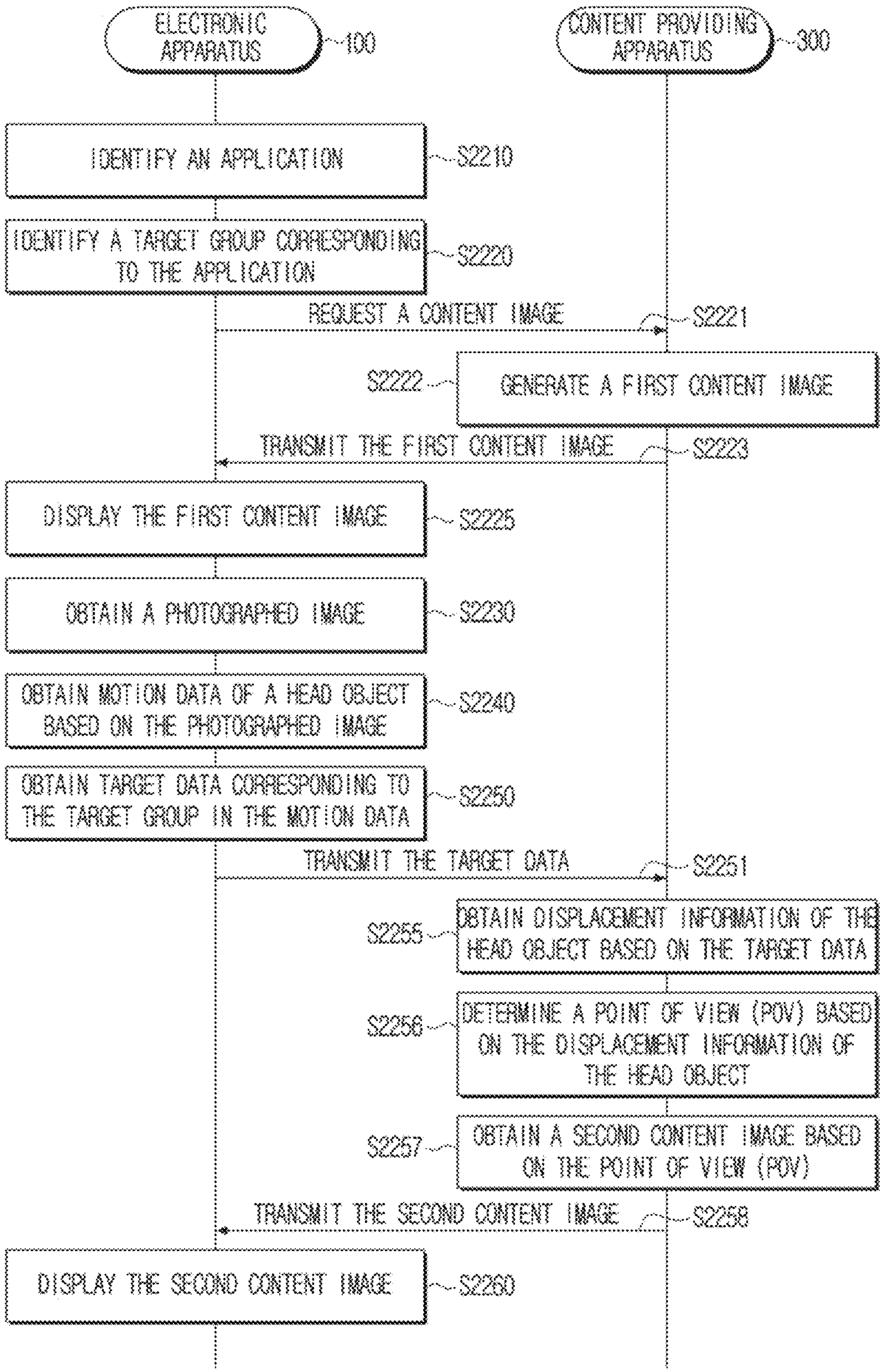
FIG. 22 is a diagram for illustrating an operation of receiving a content image from a content providing apparatus according to an embodiment.

FIG. 22 is a diagram for illustrating an operation of receiving a content image from the content providing apparatus 300 according to an embodiment.

The steps S2210, S2220, S2225, S2230, S2240, S2250, and S2260 in FIG. 22 may correspond to the steps S2110, S2120, S2125, S2130, S2140, S2150, and S2160 in FIG. 21. Accordingly, overlapping explanation will be omitted.

After the target group is identified, the electronic apparatus 100 may request a content image to the content providing apparatus 300 in the step S2221.

The content providing apparatus 300 may receive the request for a content image from the electronic apparatus 100. The content providing apparatus 300 may generate a first content image in response to the request in the step S2222. The content providing apparatus 300 may transmit the first content image to the electronic apparatus 100 in the step S2223.

The electronic apparatus 100 may receive the first content image from the content providing apparatus 300. The electronic apparatus 100 may display the first content image in the step S2225.

After displaying the first content image, the electronic apparatus 100 may perform the steps S2225, S2230, S2240, and S2250.

After the target data is obtained, the electronic apparatus 100 may transmit the target data to the content providing apparatus 300 in the step S2251.

The content providing apparatus 300 may receive the target data from the electronic apparatus 100. The content providing apparatus 300 may obtain displacement information of a head object based on the target data in the step S2255. The content providing apparatus 300 may determine a point of view (POV) based on the displacement information of the head object in the step S2256. The content providing apparatus 300 may generate a second content image based on the point of view. The content providing apparatus 300 may transmit the second content image to the electronic apparatus 100 in the step S2258.

The steps S2255, S2256, and S2257 may correspond to the steps S2155, S2156, and S2157 in FIG. 21. Meanwhile, only the subjects performing the operations may be different. Accordingly, overlapping explanation will be omitted.

The electronic apparatus 100 may receive the second content image from the content providing apparatus 300. The electronic apparatus 100 may display the second content image in the step S2260.

There may be various methods of obtaining motion data. The electronic apparatus 100 may track a movement of the location and a rotation angle of a head object by various methods based on a photographed image.

As an example, the electronic apparatus 100 may transmit only information on the point of view (POV) to the content providing apparatus 300. The electronic apparatus 100 may directly perform the steps S2255 and S2256, and transmit only information on the point of view (POV) to the content providing apparatus 300.

As an example, the motion data may include values changed based on the starting time of tracking. The electronic apparatus 100 may obtain elements changed based on the first time as an x value, a y value, a z value, a roll value, a pitch value, a yaw value, etc. The electronic apparatus 100 may track the head object in real time based on the tracking time. The electronic apparatus 100 may provide a content image based on the motion data of the tracked head object.

As an example, the motion data may include information indicating the location of the head object identified on an absolute coordinate in a 3D space. The motion data may be obtained based on a photographed image that was photographed by the electronic apparatus 100. The electronic apparatus 100 may generate a 3D space (or a depth map) based on the location of the camera 190. The electronic apparatus 100 may track a movement of the head object in the 3D space. The electronic apparatus 100 may provide a content image based on a difference in the motion data indicating the head object. Explanation in this regard will be described in FIG. 23.

Figure 23:
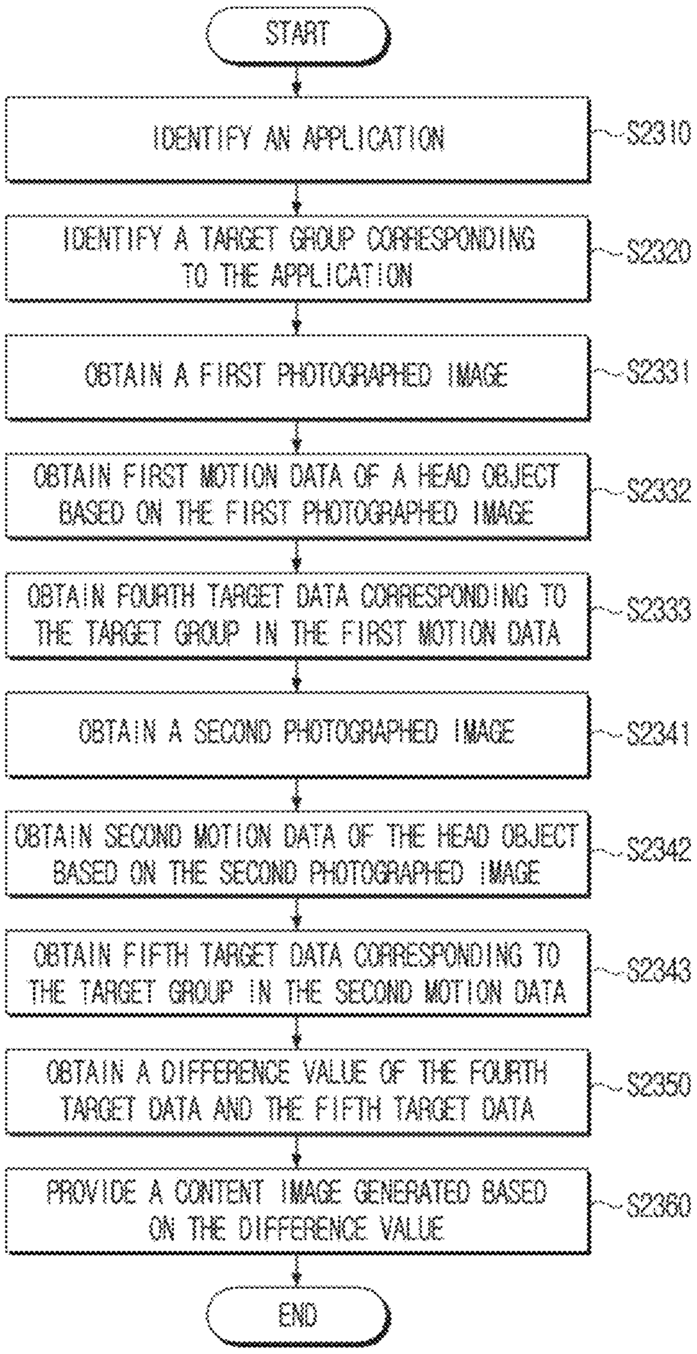
FIG. 23 is a diagram for illustrating an operation of providing a content image based on a difference value of sensing data obtained among a plurality of photographed images according to an embodiment.

FIG. 23 is a diagram for illustrating an operation of providing a content image based on a difference value of motion data obtained among a plurality of photographed images according to an embodiment.

The steps S2310 and S2320 in FIG. 23 may correspond to the steps S1110 and S1120 in FIG. 11. Accordingly, overlapping explanation will be omitted.

The electronic apparatus 100 may obtain a first photographed image in the step S2331. The electronic apparatus 100 may obtain first motion data of a head object based on the first photographed image in the step S2332. The electronic apparatus 100 may obtain fourth target data corresponding to the target group in the first motion data in the step S2333.

The electronic apparatus 100 may obtain a second photographed image in the step S2341. The electronic apparatus 100 may obtain second motion data of the head object based on the second photographed image in the step S2342. The electronic apparatus 100 may obtain fifth target data corresponding to the target group in the second motion data in the step S2343.

The electronic apparatus 100 may obtain a difference value of the fourth target data and the fifth target data in the step S2350. The electronic apparatus 100 may provide a content image generated based on the difference value in the step S2360.

FIG. 24 is a diagram for illustrating a content image provided in an application of a first group according to an embodiment.

According to the embodiment 2410 in FIG. 24, the electronic apparatus 100 may display the first image provided by an application classified as the first group.

According to the embodiment 2420 in FIG. 24, if the user moves to the y axis, the electronic apparatus 100 may display the second image based on a point of view (POV) changed according to the movement of the user. The second image may be an image that is obtained based on moving the point of view of the first image to the left side. The application may generate the second image by using motion data indicating the movement of the user.

Figure 25:
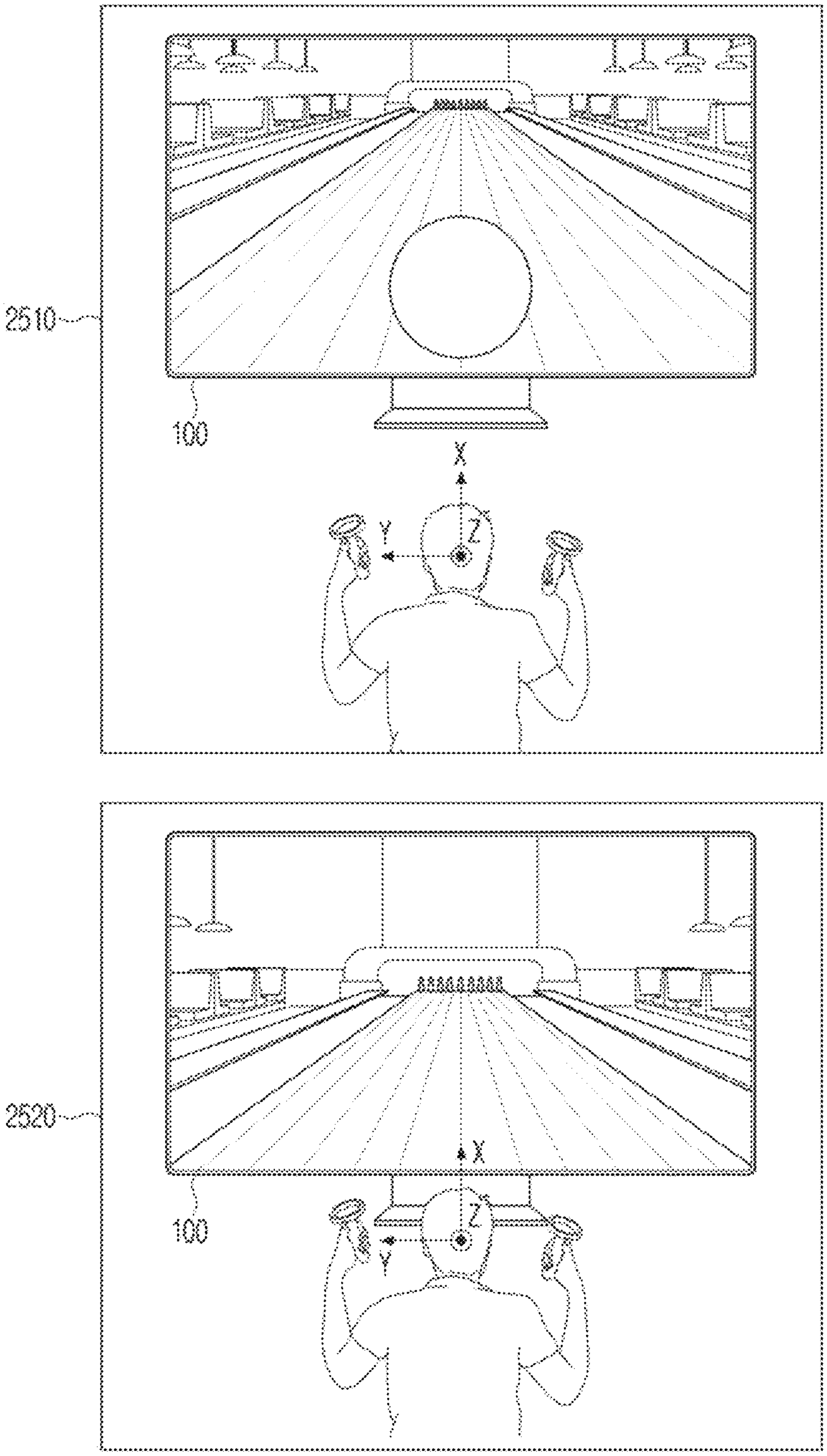
FIG. 25 is a diagram for illustrating a content image provided in an application of a first group according to an embodiment.

FIG. 25 is a diagram for illustrating a content image provided in an application of a first group according to an embodiment.

According to the embodiment 2510 in FIG. 25, the electronic apparatus 100 may display the first image provided by an application classified as the first group.

According to the embodiment 2520 in FIG. 25, if the user moves to the x axis, the electronic apparatus 100 may display the second image based on a point of view (POV) changed according to the movement of the user. The second image may be an image that is obtained based on moving the point of view of the first image to the front side. The application may generate the second image by using motion data indicating the movement of the user.

Figure 26:
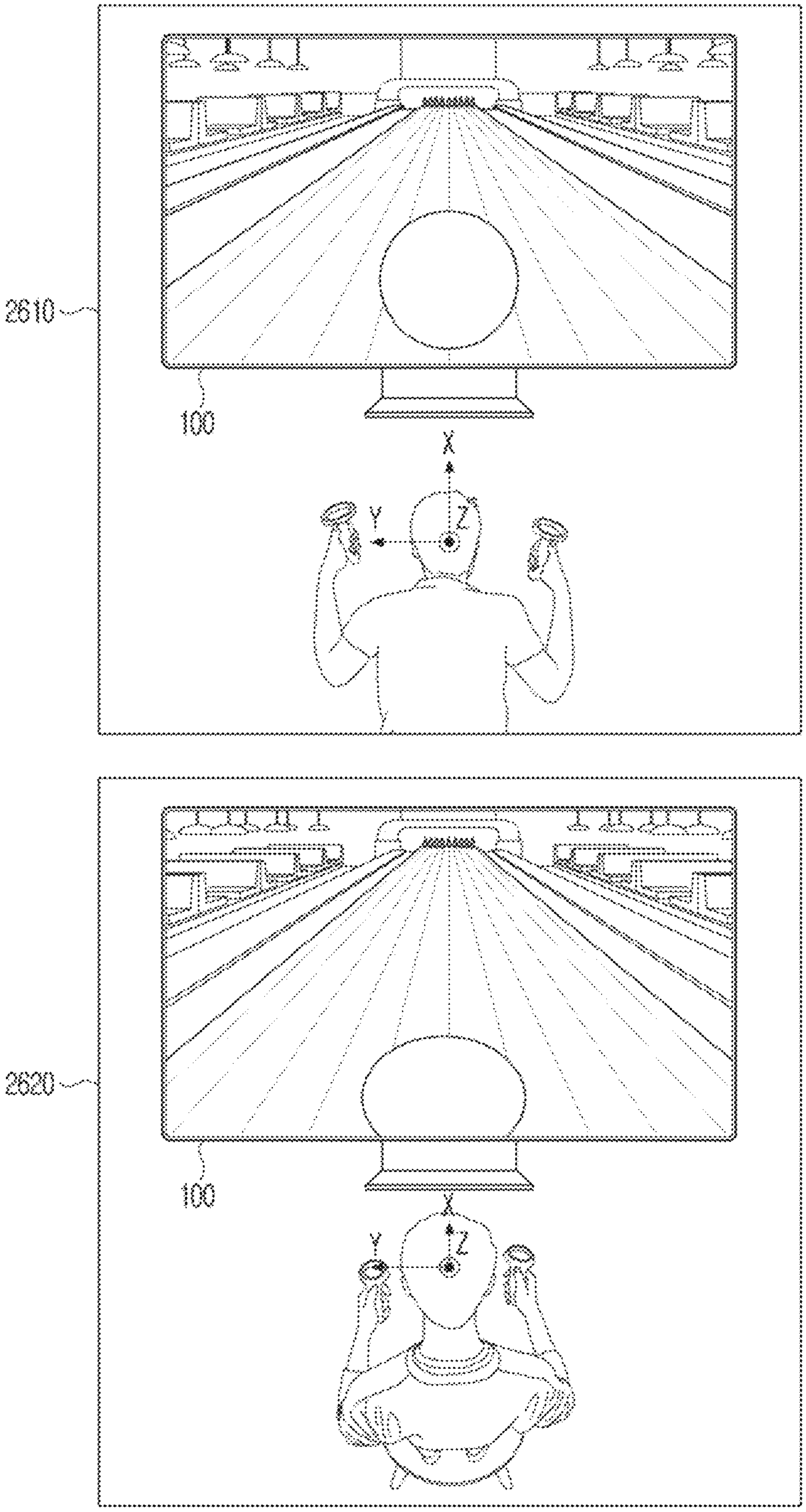
FIG. 26 is a diagram for illustrating a content image provided in an application of a first group according to an embodiment.

FIG. 26 is a diagram for illustrating a content image provided in an application of a first group according to an embodiment.

According to the embodiment 2610 in FIG. 26, the electronic apparatus 100 may display the first image provided by an application classified as the first group.

According to the embodiment 2620 in FIG. 26, if the user moves to the z axis, the electronic apparatus 100 may display the second image based on a point of view (POV) changed according to the movement of the user. The second image may be an image that is obtained based on moving the point of view of the first image to the upper side. The application may generate the second image by using motion data indicating the movement of the user.

Figure 27:
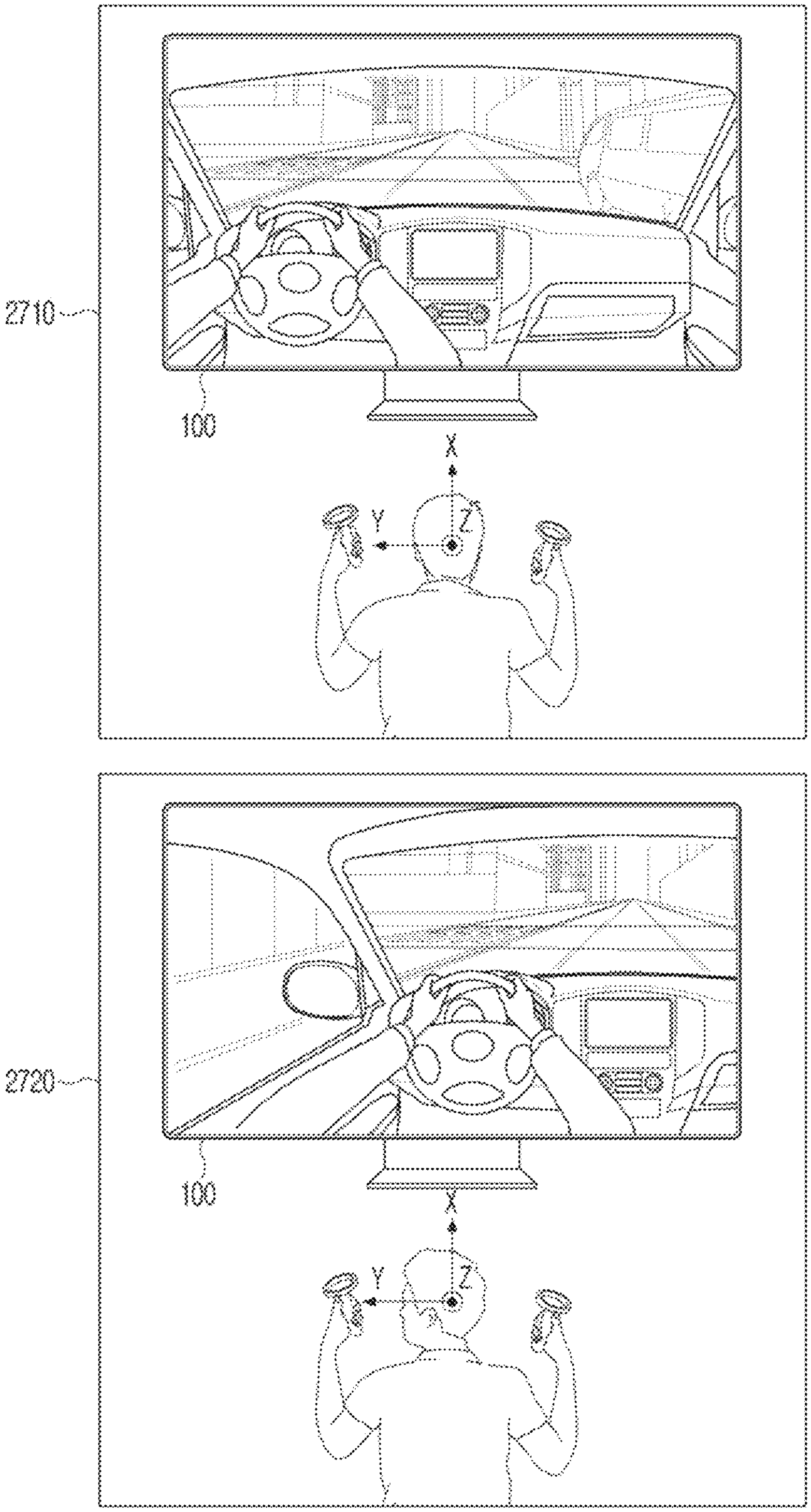
FIG. 27 is a diagram for illustrating a content image provided in an application of a second group according to an embodiment.

FIG. 27 is a diagram for illustrating a content image provided in an application of a second group according to an embodiment.

According to the embodiment 2710 in FIG. 27, the electronic apparatus 100 may display the first image provided by an application classified as the second group.

According to the embodiment 2720 in FIG. 27, it is assumed that the user rotated the head in the left direction. Also, it is assumed that the z axis is viewed from the reference point p0 in FIG. 7. The user may rotate the head in a clockwise direction centered around the z axis. The electronic apparatus 100 may display the second image based on a point of view (POV) changed according to the rotation of the user's head. The second image may be obtained based on rotating the point of view of the first image in the left direction. The application may generate the second image by using motion data indicating the movement of the user.

Figure 28:
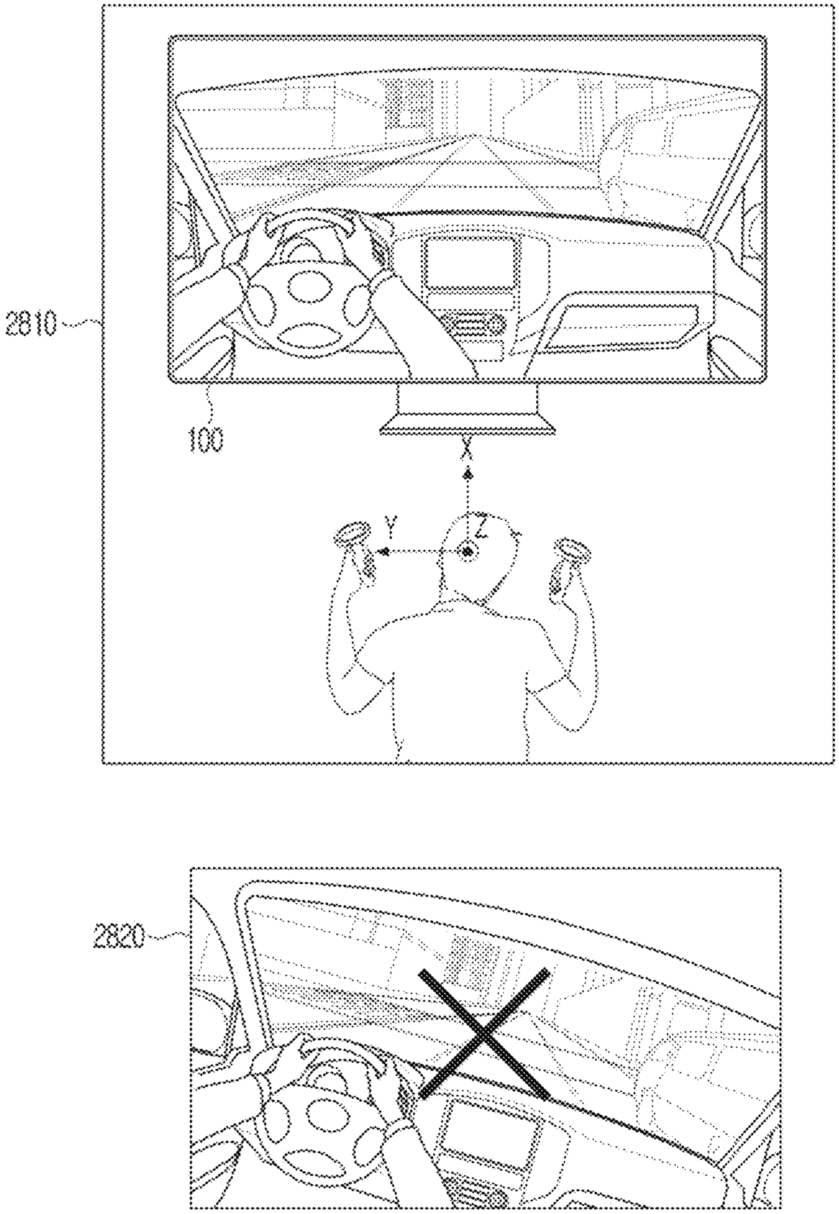
FIG. 28 is a diagram for illustrating a content image provided in an application of a second group according to an embodiment.

FIG. 28 is a diagram for illustrating a content image provided in an application of a second group according to an embodiment.

According to the embodiment 2810 in FIG. 28, it is assumed that the user rotated the head in a clockwise direction based on the front side. Also, it is assumed that the x axis is viewed from the reference point p0 in FIG. 7. The user may rotate the head in a clockwise direction centered around the x axis. The electronic apparatus 100 may obtain motion data indicating the rotation of the user's head. The electronic apparatus 100 may obtain motion data including a roll value.

If the application is classified as the second group, the electronic apparatus 100 may not use the roll value in the motion data. The electronic apparatus 100 may obtain target data not including the roll value.

This is because rotation of the roll value in the application classified as the second group may provide an uncomfortable experience to the user. In the case of using the roll value, the application had to generate an image 2820. However, in an application in which a movement range of a field of view is limited, movement of the roll value may rather provide a sensitive experience of screen conversion to the user. As the user's head may move unconsciously, the application may display an image without using the roll value.

The embodiment 2810 in FIG. 28 may indicate an operation of not converting an image in spite of a rotation of the user's head.

Figure 29:
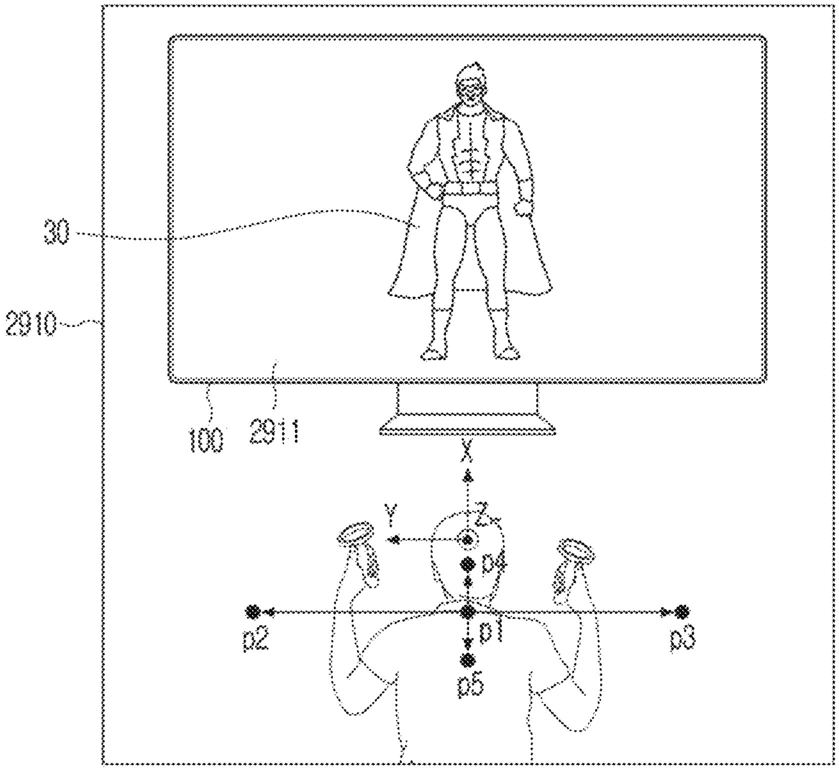
FIG. 29 is a diagram for illustrating a content image provided in an application of a third group according to an embodiment.

FIG. 29 is a diagram for illustrating a content image provided in an application of a third group according to an embodiment.

Referring to the embodiment 2910 in FIG. 29, the user may move to various positions p2, p3, p4, p5 from the first position p1 which is the current location.

Based on the first position, the electronic apparatus 100 may provide a first image 2911 generated based on a first point of view (POV) corresponding to the first position. The first image 2911 may include a virtual object 30. The virtual object 30 is not a subject of manipulation by the user, but may be a subject viewed by the user.

If the user changes the location, the application may change a point of view corresponding to the change of the user's location, and provide an image corresponding to the changed point of view.

The application may perform an additional correcting operation for the pitch value and the yaw value according to the change of the user's location. A calculation operation related to this will be described in FIG. 19 and FIG. 20. In FIG. 30 to FIG. 33, images generated based on corrected values will be explained.

If an application of the third group is identified, the electronic apparatus 100 may convert the target data. The electronic apparatus 100 may perform conversion (or correction) for the pitch value and the yaw value in the target data.

Figure 30:
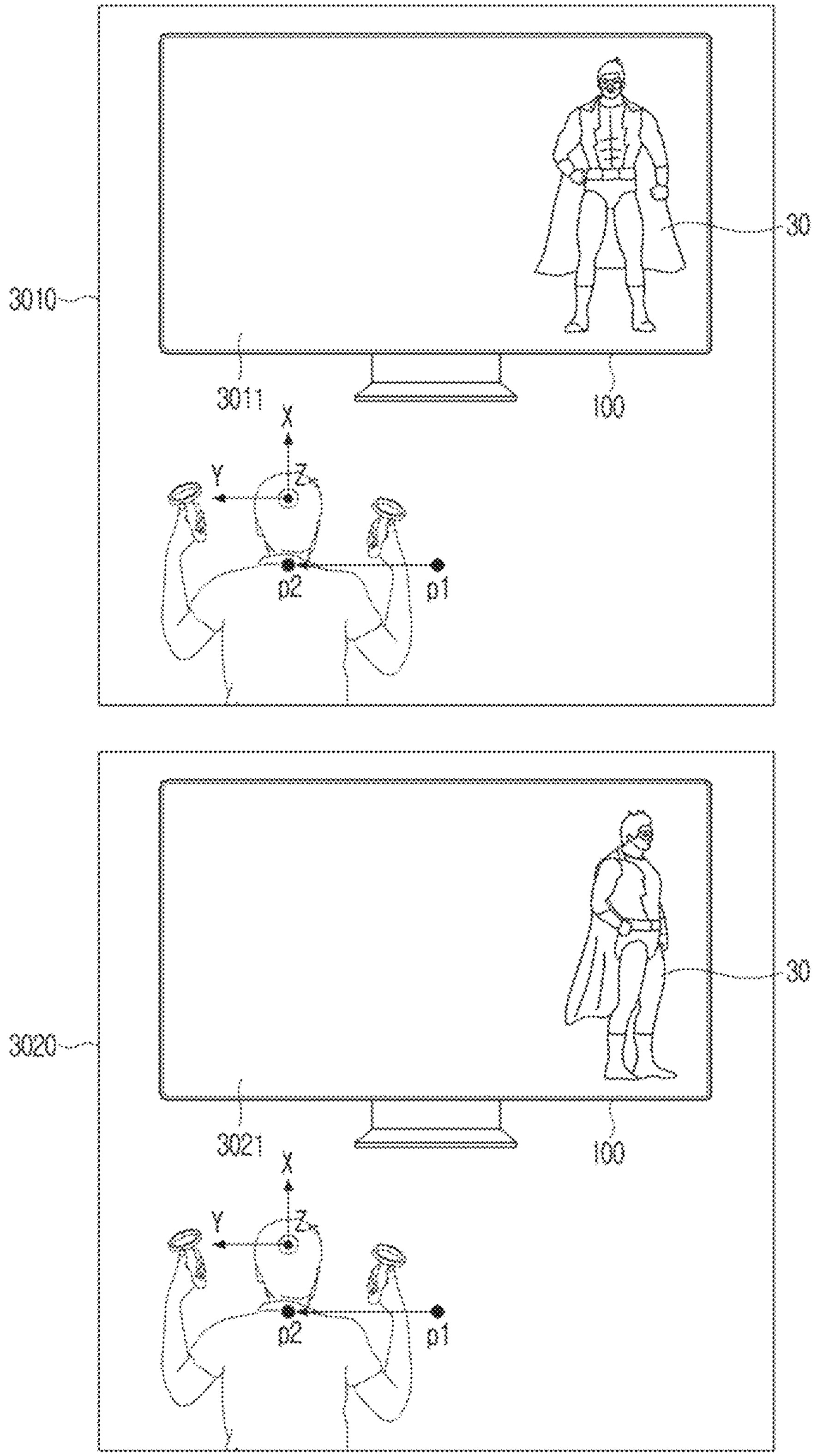
FIG. 30 is a diagram for illustrating a content image provided in an application of a third group according to an embodiment.

FIG. 30 is a diagram for illustrating a content image provided in an application of a third group according to an embodiment.

It is assumed that the user moved from the first position p1 to the second position p2. The second position p2 may be a position that was moved from the first position p1 in the y axis direction (+).

The embodiment 3010 in FIG. 30 may indicate an image generated based on target data that was not corrected. The electronic apparatus 100 may display a second image 3011 generated based on a second point of view corresponding to the second position p2.

The embodiment 3020 in FIG. 30 may indicate an image generated based on the corrected target data. The electronic apparatus 100 may obtain a third point of view by additionally correcting the yaw value on the second point of view corresponding to the second position p2. The electronic apparatus 100 may display a third image 3021 generated based on the third point of view.

It is assumed that the z axis is viewed from the reference point p0 in FIG. 7. The third point of view may be a point of view that was rotated in a counter-clockwise direction more than the second point of view centered around the z axis. The application may obtain the third point of view by correcting the yaw value on the second point of view. The application may generate the third image 3021 corresponding to the third point of view.

Figure 31:
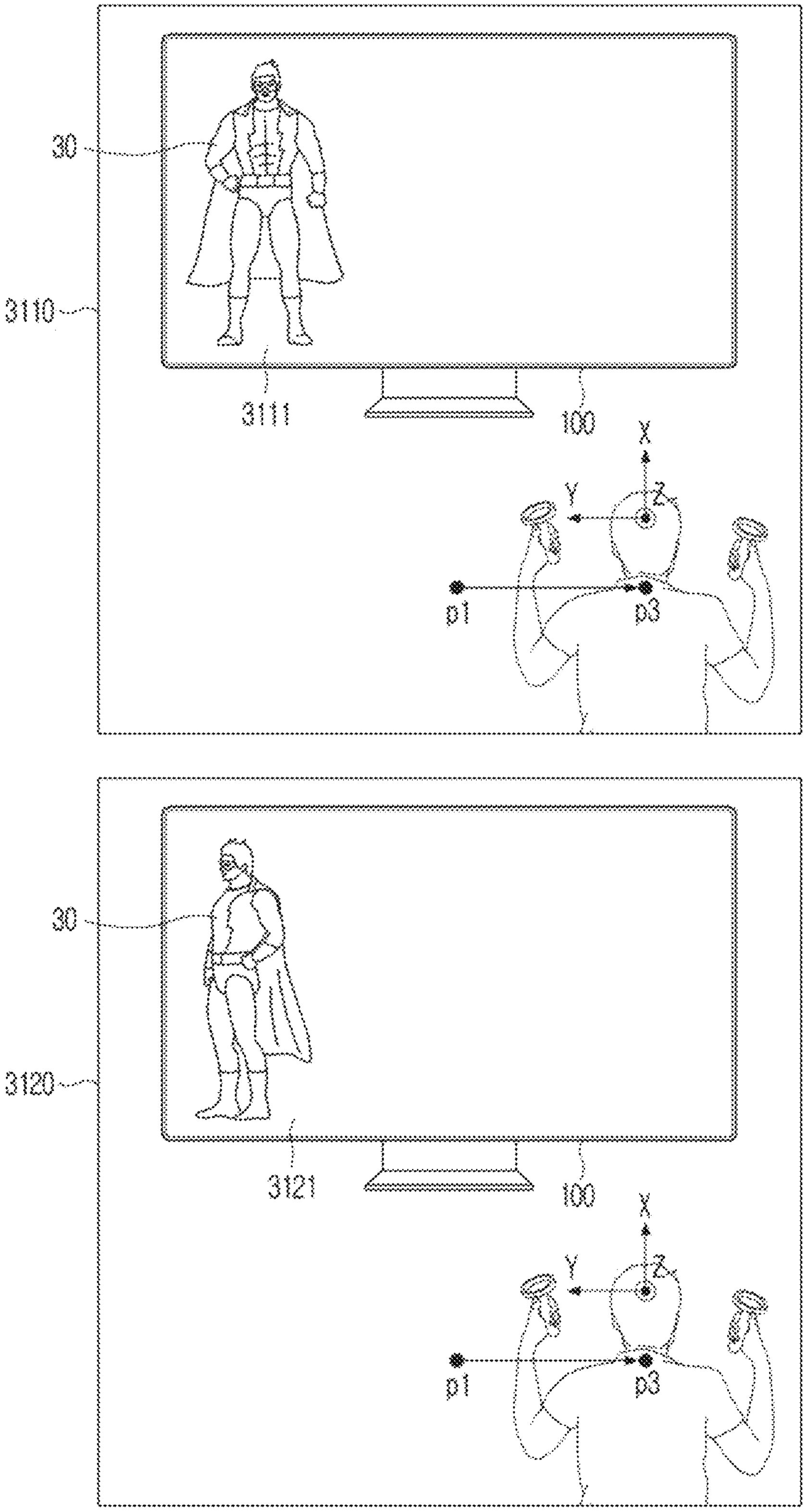
FIG. 31 is a diagram for illustrating a content image provided in an application of a third group according to an embodiment.

FIG. 31 is a diagram for illustrating a content image provided in an application of a third group according to an embodiment.

It is assumed that the user moved from the first position p1 to the third position p3. The third position p3 may be a position that was moved from the first position p1 in the y axis direction (−).

The embodiment 3110 in FIG. 31 may indicate an image generated based on target data that was not corrected. The electronic apparatus 100 may display a fourth image 3111 generated based on a fourth point of view corresponding to the third position p3.

The embodiment 3120 in FIG. 31 may indicate an image generated based on the corrected target data. The electronic apparatus 100 may obtain a fifth point of view by additionally correcting the yaw value on the fourth point of view corresponding to the third position p3. The electronic apparatus 100 may display a fifth image 3121 generated based on the fifth point of view.

It is assumed that the z axis is viewed from the reference point p0 in FIG. 7. The fifth point of view may be a point of view that was rotated in a clockwise direction more than the fourth point of view centered around the z axis. The application may obtain the fifth point of view by correcting the yaw value on the fourth point of view. The application may generate the fifth image 3121 corresponding to the fifth point of view.

Figure 32:
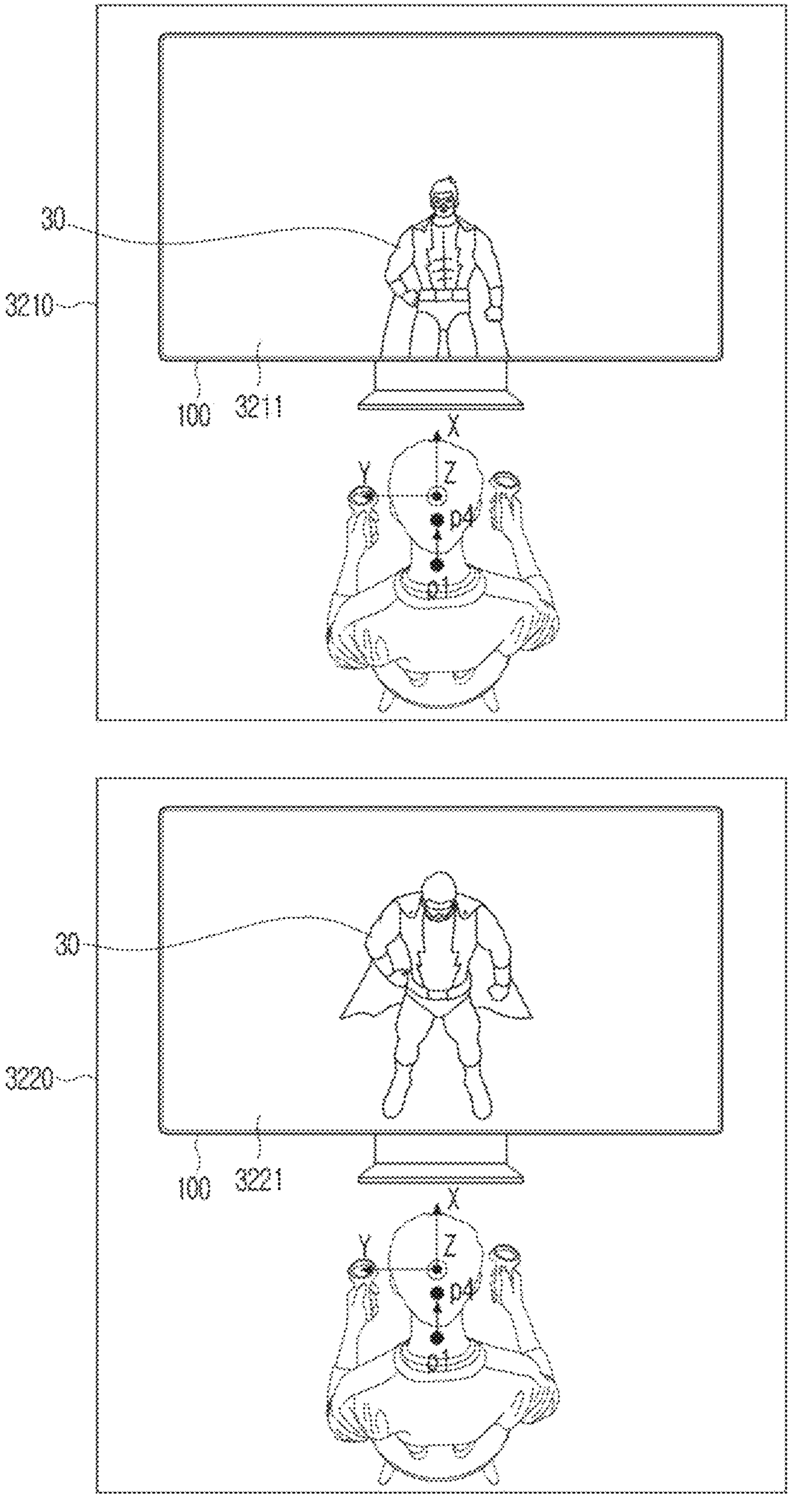
FIG. 32 is a diagram for illustrating a content image provided in an application of a third group according to an embodiment.

FIG. 32 is a diagram for illustrating a content image provided in an application of a third group according to an embodiment.

It is assumed that the user moved from the first position p1 to the fourth position p4. The fourth position p4 may be a position that was moved from the first position p1 in the z axis direction (+).

The embodiment 3210 in FIG. 32 may indicate an image generated based on target data that was not corrected. The electronic apparatus 100 may display a sixth image 3211 generated based on a sixth point of view corresponding to the fourth position p4.

The embodiment 3220 in FIG. 32 may indicate an image generated based on the corrected target data. The electronic apparatus 100 may obtain a seventh point of view by additionally correcting the pitch value on the sixth point of view corresponding to the fourth position p4. The electronic apparatus 100 may display a seventh image 3221 generated based on the seventh point of view.

It is assumed that the y axis is viewed from the reference point p0 in FIG. 7. The seventh point of view may be a point of view that was rotated in a clockwise direction more than the sixth point of view centered around the y axis. The application may obtain the seventh point of view by correcting the pitch value on the sixth point of view. The application may generate the seventh image 3221 corresponding to the seventh point of view.

Figure 33:
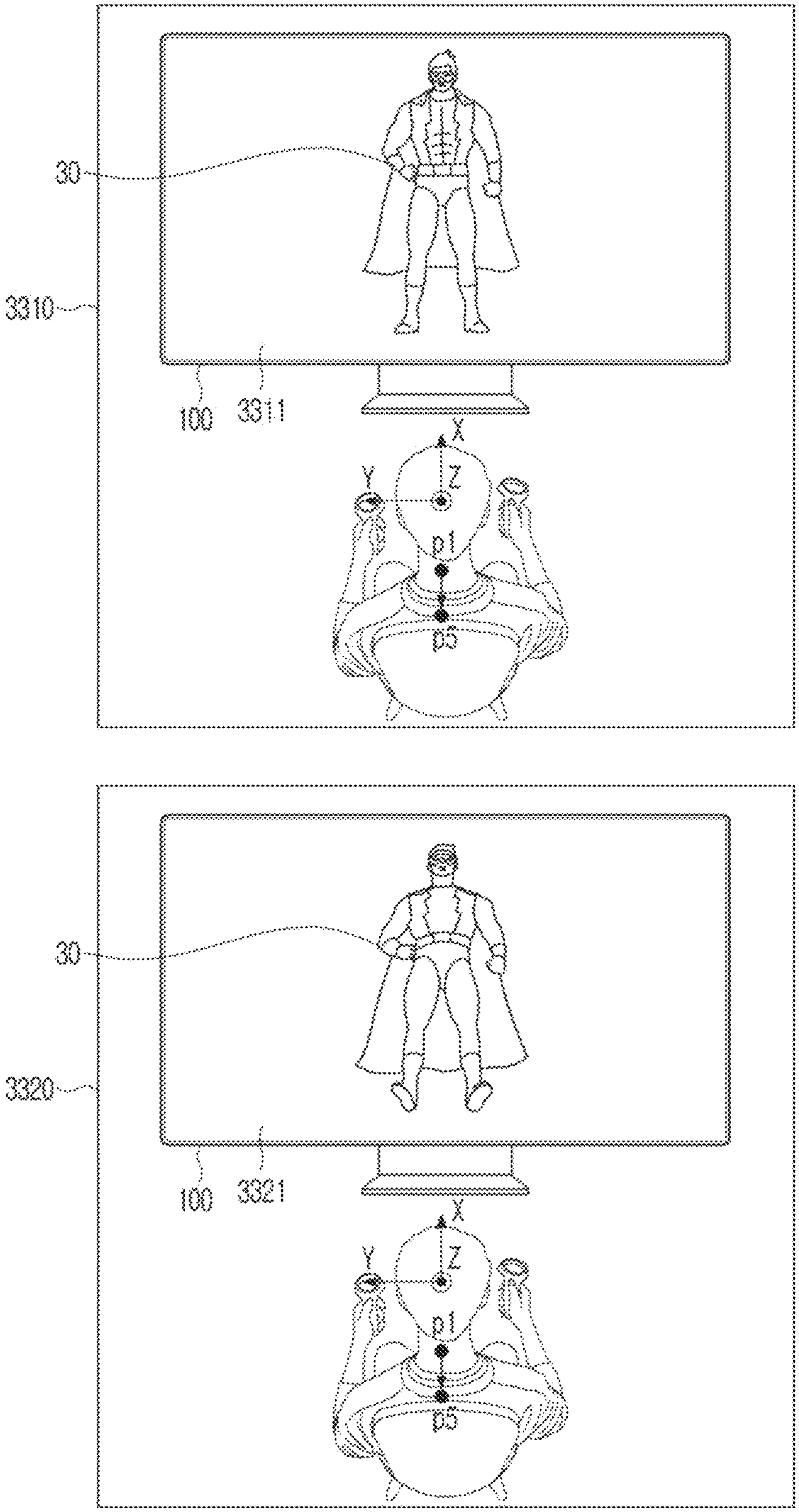
FIG. 33 is a diagram for illustrating a content image provided in an application of a third group according to an embodiment.

FIG. 33 is a diagram for illustrating a content image provided in an application of a third group according to an embodiment.

It is assumed that the user moved from the first position p1 to the fifth position p5. The fifth position p5 may be a position that was moved from the first position p1 in the z axis direction (−).

The embodiment 3310 in FIG. 33 may indicate an image generated based on target data that was not corrected. The electronic apparatus 100 may display an eighth image 3311 generated based on an eighth point of view corresponding to the fifth position p5.

The embodiment 3320 in FIG. 33 may indicate an image generated based on the corrected target data. The electronic apparatus 100 may obtain a ninth point of view by additionally correcting the pitch value on the eighth point of view corresponding to the fifth position p5. The electronic apparatus 100 may display a ninth image 3321 generated based on the ninth point of view.

It is assumed that the y axis is viewed from the reference point p0 in FIG. 7. The ninth point of view may be a point of view that was rotated in a counter-clockwise direction more than the eighth point of view centered around the y axis. The application may obtain the ninth point of view by correcting the pitch value on the eighth point of view. The application may generate the ninth image 3321 corresponding to the ninth point of view.

Figure 34:
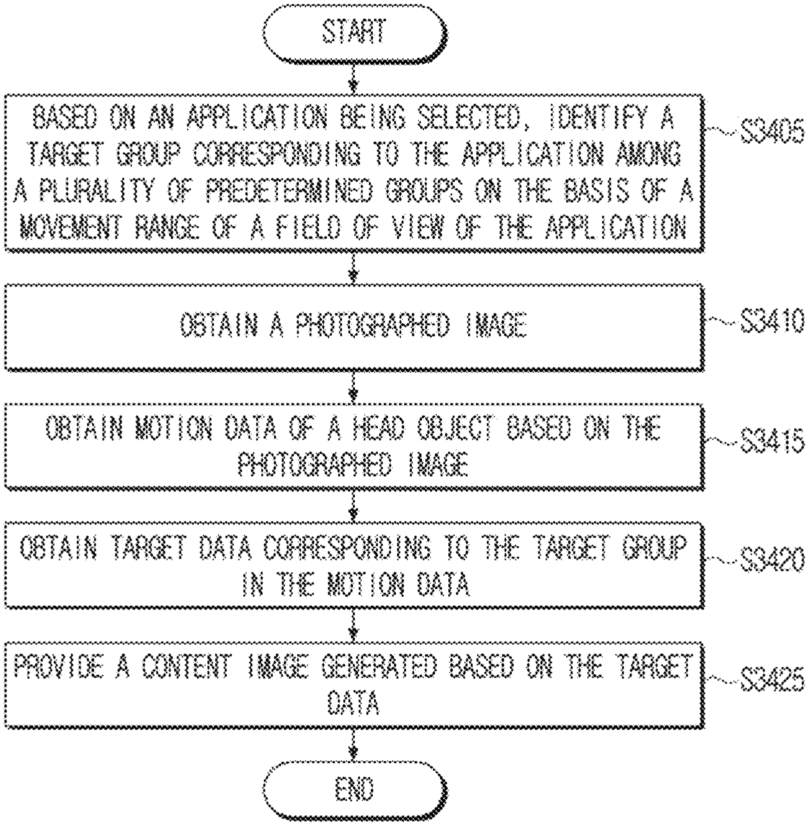
FIG. 34 is a diagram for illustrating a controlling method of an electronic device according to an embodiment.

FIG. 34 is a diagram for illustrating a controlling method of the electronic device according to an embodiment.

Referring to FIG. 34, a controlling method of an electronic device may include the steps of, based on an application being selected, identifying a target group corresponding to the application among a plurality of predetermined groups on the basis of a movement range of a field of view of the application (S3405), obtaining a photographed image (S3410), obtaining motion data of a head object based on the photographed image (S3415), obtaining target data corresponding to the target group in the motion data (S3420), and providing a content image generated based on the target data (S3425).

In the step S3405 of identifying the target group, based on the application being selected, the movement range of a field of view of the application may be obtained, and based on a table of groups of movement ranges of a field of view stored in the electronic device, the target group corresponding to the movement range of a field of view among the plurality of predetermined groups may be identified.

In the step S3415 of obtaining the motion data, the head object may be identified in the photographed image, and the motion data indicating a movement of the head object may be obtained, and the motion data may include at least one of an x value, a y value, a z value, a roll value, a pitch value, or a yaw value.

In the step S3420 of obtaining the target data, the target data corresponding to the target group may be obtained based on tables of target data for each group stored in the electronic device.

In the step S3405 of identifying the target group, based on the movement range of a field of view being smaller than or equal to a first threshold angle, the application may be classified as a first group, and based on the movement range of a field of view exceeding the first threshold angle and being smaller than or equal to a second threshold angle, the application may be classified as a second group, and based on the movement range of a field of view exceeding the second threshold angle, the application may be classified as a third group.

In the step S3420 of obtaining the target data, based on the target group being the first group, the target data including the x value, the y value, and the z value may be obtained.

In the step S3420 of obtaining the target data, based on the target group being the second group, the target data including the x value, the y value, the z value, the pitch value, and the yaw value may be obtained.

In the step S3420 of obtaining the target data, based on the target group being the third group, the target data including the x value, the y value, the z value, the pitch value, and the yaw value may be obtained.

The controlling method may include the step of converting the target data based on a data conversion table stored in the electronic device, and in the step S3425 of providing the content image, the content image generated based on the converted target data may be provided.

In the step of converting the target data, the yaw value may be converted based on a value of multiplying the y value with a first constant, the pitch value may be converted based on a value of multiplying the z value with a second constant, and the converted target data including the x value, the y value, the z value, the converted pitch value, and the converted yaw value may be obtained.

Meanwhile, the methods according to the aforementioned various embodiments of the disclosure may be implemented in forms of applications that can be installed on conventional electronic device.

Also, the methods according to the aforementioned various embodiment of the disclosure may be implemented just with software upgrade, or hardware upgrade for a conventional electronic device.

In addition, the aforementioned various embodiments of the disclosure may also be performed through an embedded server provided on an electronic device, or an external server of at least one of an electronic device or a display apparatus.

Further, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include a signal, and is tangible, and the term does not distinguish a case wherein data is stored in the storage medium semi-permanently and a case wherein data is stored temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: compact disc read only memory (CD-ROM)), or distributed on-line through an application store. In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g.: a module or a program) according to the aforementioned various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions that were performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
- a camera;
- memory storing instructions; and
- at least one processor including processing circuitry,
- wherein the instructions, when executed by the at least one processor individually or collectively, cause the electronic device to:
  - based on an application being selected, identify a target group of one or more motion parameters among a plurality of predetermined groups of motion parameters based on a movement range of a field of view of the application,
  - obtain an image from the camera,
  - obtain motion data of a head object based on the image,
  - obtain target data corresponding to the target group from the motion data, and
  - provide a content image based on the target data.

2. The electronic device of claim 1, wherein the instructions, when executed by the at least one processor individually or collectively, further cause the electronic device to:
- based on the application being selected, obtain the movement range of the field of view of the application, and
- based on a table including the plurality of predetermined groups respectively corresponding to a plurality of movement ranges of the field of view stored in the memory, identify the target group corresponding to the movement range of the field of view among the plurality of predetermined groups.

3. The electronic device of claim 1, wherein the instructions, when executed by the at least one processor individually or collectively, further cause the electronic device to:
- identify the head object in the image, and
- obtain the motion data based on a movement of the head object, and
- wherein the motion data comprises:
  - at least one of a first value corresponding to a movement along a first direction, a second value corresponding to a movement along a second direction, a third value corresponding to a movement along a third direction, a roll value corresponding to a rotation about the first direction, a pitch value corresponding to a rotation about the second direction, or a yaw value corresponding to a rotation about the third direction.

4. The electronic device of claim 3, wherein the instructions, when executed by the at least one processor individually or collectively, further cause the electronic device to:
- obtain the target data corresponding to the target group based on target data tables for the plurality of predetermined groups stored in the memory.

5. The electronic device of claim 4, wherein the instructions, when executed by the at least one processor individually or collectively, further cause the electronic device to:
- based on the movement range of the field of view being less than or equal to a first threshold angle, classify the application as a first group,
- based on the movement range of the field of view exceeding the first threshold angle and being less than or equal to a second threshold angle, classify the application as a second group, and
- based on the movement range of the field of view exceeding the second threshold angle, classify the application as a third group.

6. The electronic device of claim 5, wherein the instructions, when executed by the at least one processor individually or collectively, further cause the electronic device to:
- based on the application being classified as the first group, obtain the target data including the first value, the second value, and the third value.

7. The electronic device of claim 5, wherein the instructions, when executed by the at least one processor individually or collectively, further cause the electronic device to:
- based on the application being classified as the second group, obtain the target data including the first value, the second value, the third value, the pitch value, and the yaw value.

8. The electronic device of claim 5, wherein the instructions, when executed by the at least one processor individually or collectively, further cause the electronic device to:

based on the application being classified as the third group, obtain the target data including the first value, the second value, the third value, the pitch value, and the yaw value.

9. The electronic device of claim 8, wherein the instructions, when executed by the at least one processor individually or collectively, further cause the electronic device to:

convert the target data based on a data conversion table stored in the memory, and provide the content image based on the converted target data.

10. The electronic device of claim 9, wherein the instructions, when executed by the at least one processor individually or collectively, further cause the electronic device to:

convert the yaw value based on a product of the second value and a first constant, convert the pitch value based on a product of the third value and a second constant, and obtain the converted target data including the first value, the second value, the third value, the converted pitch value, and the converted yaw value.

11. A controlling method of an electronic device, the method comprising:

based on an application being selected, identifying a target group of one or more motion parameters among a plurality of predetermined groups of motion parameters based on a movement range of a field of view of the application;

obtaining an image;

obtaining motion data of a head object based on the image;

obtaining target data corresponding to the target group from the motion data; and providing a content image based on the target data.

12. The controlling method of claim 11, wherein the identifying the target group comprises:

based on the application being selected, obtaining the movement range of the field of view of the application; and based on a table including the plurality of predetermined groups respectively corresponding to a plurality of movement ranges of the field of view stored in the electronic device, identifying the target group corresponding to the movement range of the field of view among the plurality of predetermined groups.

13. The controlling method of claim 11, wherein the obtaining the motion data comprises:

identifying the head object in the image; and obtaining the motion data based on a movement of the head object, and wherein the motion data comprises:

at least one of a first value corresponding to a movement along a first direction, a second value corresponding to a movement along a second direction, a third value corresponding to a movement along a third direction, a roll value corresponding to a rotation about the first direction, a pitch value corresponding to a rotation about the second direction, or a yaw value corresponding to a rotation about the third direction.

14. The controlling method of claim 13, wherein the obtaining the target data comprises:

obtaining the target data corresponding to the target group based on target data tables for the plurality of predetermined groups stored in the electronic device.

15. The controlling method of claim 14, wherein the identifying the target group comprises:

based on the movement range of the field of view being less than or equal to a first threshold angle, classifying the application as a first group;

based on the movement range of the field of view exceeding the first threshold angle and being less than or equal to a second threshold angle, classifying the application as a second group; and based on the movement range of the field of view exceeding the second threshold angle, classifying the application as a third group.

16. An electronic device comprising:

memory storing instructions; and at least one processor including processing circuitry and operatively connected to a sensor, wherein the instructions, when executed by the at least one processor individually or collectively, cause the electronic device to:

based on an application being selected, identify a target group of one or more motion parameters among a plurality of predetermined groups of motion parameters based on a movement range of a field of view of the application, obtain motion data of a head object based on the sensor, obtain target data corresponding to the target group from the motion data, and provide a content image based on the target data.

17. The electronic device of claim 16, wherein the instructions, when executed by the at least one processor individually or collectively, further cause the electronic device to:

based on the application being selected, obtain the movement range of the field of view of the application, and based on a table including the plurality of predetermined groups respectively corresponding to a plurality of movement ranges of the field of view stored in the memory, identify the target group corresponding to the movement range of the field of view among the plurality of predetermined groups.

18. The electronic device of claim 16, wherein the motion data is obtained based on a movement of the head object sensed by the sensor, and wherein the motion data comprises:

at least one of a first value corresponding to a movement along a first direction, a second value corresponding to a movement along a second direction, a third value corresponding to a movement along a third direction, a roll value corresponding to a rotation about the first direction, a pitch value corresponding to a rotation about the second direction, or a yaw value corresponding to a rotation about the third direction.

19. The electronic device of claim 18, wherein the instructions, when executed by the at least one processor individually or collectively, further cause the electronic device to:

obtain the target data corresponding to the target group based on target data tables for the plurality of predetermined groups stored in the memory.

20. The electronic device of claim 19, wherein the instructions, when executed by the at least one processor individually or collectively, further cause the electronic device to:

based on the movement range of the field of view being less than or equal to a first threshold angle, classify the application as a first group, based on the movement range of the field of view exceeding the first threshold angle and being less than or equal to a second threshold angle, classify the application as a second group, and based on the movement range of the field of view exceeding the second threshold angle, classify the application as a third group.

* * * * *